United States Patent
Andoh et al.

(10) Patent No.: US 6,654,904 B1
(45) Date of Patent: Nov. 25, 2003

(54) METHOD FOR REGISTERING, IN A DEFECT MAP, ADDRESSES OF DEFECTIVE SECTORS OF A DATA RECORDING MEDIUM

(75) Inventors: Haruo Andoh, Zama (JP); Takahi Kuroda, Yamato (JP)

(73) Assignee: International Business Machines Corporation, Armonk, NY (US)

(*) Notice: Subject to any disclaimer, the term of this patent is extended or adjusted under 35 U.S.C. 154(b) by 559 days.

(21) Appl. No.: 09/598,402

(22) Filed: Jun. 20, 2000

(30) Foreign Application Priority Data

Jun. 29, 1999 (JP) .......................... 11-183504

(51) Int. Cl.$^7$ .......................... G06F 11/00; G11C 29/00
(52) U.S. Cl. .......................... 714/8; 714/6; 369/53.15; 369/53.17
(58) Field of Search .......................... 714/8, 6, 42; 369/53.41, 369/53.15, 53.17, 47.14

(56) References Cited

U.S. PATENT DOCUMENTS

| | | | |
|---|---|---|---|
| 5,442,614 A | * | 8/1995 | Tamegai .................. 369/53.17 |
| 5,523,903 A | * | 6/1996 | Hetzler et al. ........... 360/77.08 |
| 5,615,190 A | * | 3/1997 | Best et al. ............... 369/53.41 |
| 5,648,954 A | * | 7/1997 | Satoh ....................... 369/53.17 |
| 6,205,099 B1 | * | 3/2001 | Sasaki et al. ............ 369/53.17 |
| 6,223,303 B1 | * | 4/2001 | Billings et al. ................ 714/8 |
| 6,272,085 B1 | * | 8/2001 | Maeda ..................... 369/53.17 |
| 6,336,202 B1 | * | 1/2002 | Tsuchimoto et al. ........ 714/768 |
| 6,496,943 B1 | * | 12/2002 | Belser et al. .................. 714/8 |

FOREIGN PATENT DOCUMENTS

| | | | | |
|---|---|---|---|---|
| JP | 03034163 A | 2/1991 | | |
| JP | 05-43355 | 6/1993 | | |
| JP | 09063203 A | 3/1997 | | |
| JP | 10112139 A | 4/1998 | | |
| JP | 11096684 A | * | 4/1999 | ........... G11B/20/12 |
| JP | 2000228069 A | 8/2000 | | |

* cited by examiner

*Primary Examiner*—Robert Beausoliel
*Assistant Examiner*—Yolanda L. Wilson
(74) *Attorney, Agent, or Firm*—G. Marlin Knight; Bracewell & Patterson, L.L.P.

(57) ABSTRACT

A method and system are disclosed to provide a defect map structure that can increase the throughput of a recording apparatus when the recording apparatus accesses a data recording medium. A defect register method according to the present invention includes the steps of detecting initial defective sectors, generating a primary defect map (PDM) where each absolute block address of initial defective sectors (D.ABA) is individually registered, discriminating a series of defective sectors consisting of a plurality of initial defective sectors with continuous D.ABA, which exist in the same track (tracks having the same cylinder identification number CYL and head identification number HED) from the individual resister PDM, and generating a PDM, where this series of defective sectors is registered in a batch, by registering a first absolute block address of the series of defective sectors (D.ABA.ST), and defective sector length (number of defective sectors D.LE) of the series of defective sectors.

18 Claims, 14 Drawing Sheets

Figure 4

| ABA | 0 | 1 | 2 | 3 | 4 | 5 | 6 | 7 | 8 | 9 |
|---|---|---|---|---|---|---|---|---|---|---|
| SEC | 0 | 1 | 2 | 3 | 4 | 5 | 6 | 7 | 8 | 9 |
| T(0,0) | SOT | ☒ | ☒ | ☒ | | | | | ☒ | ☒ EOT |
| LBA | | 1 | | | 2 | 3 | 4 | 5 | | |

| ABA | 10 | 11 | 12 | 13 | 14 | 15 | 16 | 17 | 18 | 19 |
|---|---|---|---|---|---|---|---|---|---|---|
| SEC | 0 | 1 | 2 | 3 | 4 | 5 | 6 | 7 | 8 | 9 |
| T(1,0) | SOT ☒ | ☒ | | | | SOR | | | | EOT |
| LBA | | | 6 | 7 | 8 | 9 | 10 | 11 | 12 | 13 |

| ABA | 20 | 21 | 22 | 23 | 24 | 25 | 26 | 27 | 28 | 29 |
|---|---|---|---|---|---|---|---|---|---|---|
| SEC | 0 | 1 | 2 | 3 | 4 | 5 | 6 | 7 | 8 | 9 |
| T(2,0) | SOT | ☒ | | | | | EOR | | | EOT |
| LBA | 14 | | 15 | 16 | 17 | 18 | 19 | 20 | 21 | 22 |

| X | D.ABA |
|---|---|
| 0 | 2 |
| 1 | 3 |
| 2 | 8 |
| 3 | 9 |
| 4 | 10 |
| 5 | 11 |
| 6 | 21 |
| ⋮ | ⋮ |

(b)

| Y | D.ABA.ST | D.LE |
|---|---|---|
| 0 | 2 | 2 |
| 1 | 8 | 2 |
| 2 | 10 | 2 |
| 3 | 21 | 1 |
| ⋮ | ⋮ | ⋮ |

(c)

| Y | F.LBA | D.LE |
|---|---|---|
| 0 | 2 | 2 |
| 1 | 6 | 2 |
| 2 | 6 | 2 |
| 3 | 15 | 1 |
| ⋮ | ⋮ | ⋮ |

| SEC | 0 | 1 | 2 | 3 | 4 | 5 | 6 | 7 | 8 | 9 |
|---|---|---|---|---|---|---|---|---|---|---|
| LBA | 0 | 1 | x | x | 2 | 3 | 4 | 5 | x | x |

(b)

| SEC | 0 | 1 | 2 | 3 | 4 | 5 | 6 | 7 | 8 | 9 |
|---|---|---|---|---|---|---|---|---|---|---|
| LBA | x | x | 6 | 7 | 8 | 9 | 10 | 11 | 12 | 13 |

(c)

| SEC | 0 | 1 | 2 | 3 | 4 | 5 | 6 | 7 | 8 | 9 |
|---|---|---|---|---|---|---|---|---|---|---|
| LBA | 14 | x | 15 | 16 | 17 | 18 | 19 | 20 | 21 | 22 |

| Y | D.A B A.S T | D.L E |
|---|---|---|
| 0 | 0 0 0 1 2 3 4 | 3 |
| 1 | 0 0 0 1 2 3 7 | 3 |
| 2 | 0 0 2 5 6 7 8 | 4 |
| 3 | 0 0 2 A B C D | 1 |
| 4 | 0 0 3 0 1 2 3 | 2 |
| ⋮ | ⋮ | ⋮ |

(A2)

VTT

| V T R A | Y.S T |
|---|---|
| 0 0 0 | 0 |
| 0 0 2 | 2 |
| 0 0 3 | 4 |
| 0 0 4 | 5 |
| ⋮ | ⋮ |

VST

| Y | V S E C | D.L E |
|---|---|---|
| 0 | 1 2 3 4 | 3 |
| 1 | 1 2 3 7 | 3 |
| 2 | 5 6 7 8 | 4 |
| 3 | A B C D | 1 |
| 4 | 0 1 2 3 | 2 |
| ⋮ | ⋮ | ⋮ |

(B1)

| Y | F.L B A | D.L E |
|---|---|---|
| 0 | 0 0 0 1 2 3 4 | 3 |
| 1 | 0 0 0 1 2 3 4 | 3 |
| 2 | 0 0 2 5 6 7 2 | 4 |
| 3 | 0 0 2 A B C D | 1 |
| 4 | 0 0 2 0 1 1 9 | 2 |
| ⋮ | ⋮ | ⋮ |

(B2)

VTT

| V T R A | Y.S T |
|---|---|
| 0 0 0 | 0 |
| 0 0 2 | 2 |
| 0 0 3 | 4 |
| 0 0 4 | 5 |
| ⋮ | ⋮ |

VST

| Y | V S E C | D.L E |
|---|---|---|
| 0 | 1 2 3 4 | 3 |
| 1 | 1 2 3 4 | 3 |
| 2 | 5 6 7 2 | 4 |
| 3 | A B C 3 | 1 |
| 4 | 0 1 1 9 | 2 |
| ⋮ | ⋮ | ⋮ |

Figure 9

| ABA SEC | 30 0 | 31 1 | 32 2 | 33 3 | 34 4 | 35 5 | 36 6 | 37 7 | 38 8 | 39 9 |
|---|---|---|---|---|---|---|---|---|---|---|
| T(3,0) | | D1 | D3 | D2 | | | | | | |
| LBA | 23 | 24 | 25 | 26 | 27 | 28 | 29 | 30 | 31 | 32 |

| ABA SEC | 100 0 | 101 1 | 102 2 | 103 3 | 104 4 | 105 5 | 106 6 | 107 7 | 108 8 | 109 9 |
|---|---|---|---|---|---|---|---|---|---|---|
| T(10,0) | | | | | | | R1 | R3 | USED | R2 |
| LBA | 90 | 91 | 92 | 93 | 94 | 95 | 96 | 97 | 98 | 99 |

| Z | D.LBA | S.LBA | LE |
|---|---|---|---|
| 0 | 24 | 96 | 1 |
| 1 | 35 | 98 | 1 |

(b)

| Z | D.LBA | S.LBA | LE |
|---|---|---|---|
| 0 | 24 | 96 | 1 |
| 1 | 26 | 99 | 1 |
| 2 | 35 | 98 | 1 |

(c)

| Z | D.LBA | S.LBA | LE |
|---|---|---|---|
| 0 | 24 | 96 | 1 |
| 1 | 25 | 97 | 1 |
| 2 | 26 | 99 | 1 |
| 3 | 35 | 98 | 1 |

(d)

| Z | D.LBA | S.LBA | LE |
|---|---|---|---|
| 0 | 24 | 96 | 2 |
| 1 | 26 | 99 | 1 |
| 2 | 35 | 98 | 1 |

| X | D.ABA |
|---|---|
| 0 | 2 |
| 1 | 3 |
| 2 | 8 |
| 3 | 9 |
| 4 | 10 |
| 5 | 11 |
| 6 | 21 |
| ⋮ | ⋮ |

(b)

| Y | D.ABA.ST | D.LE |
|---|---|---|
| 0 | 2 | 2 |
| 1 | 8 | 4 |
| 2 | 21 | 1 |
| ⋮ | ⋮ | ⋮ |

(c)

| Y | F.LBA | D.LE |
|---|---|---|
| 0 | 2 | 2 |
| 1 | 6 | 4 |
| 2 | 13 | 1 |
| ⋮ | ⋮ | ⋮ |

| SEC | 0 | 1 | 2 | 3 | 4 | 5 | 6 | 7 | 8 | 9 |
|-----|---|---|---|---|---|---|---|---|---|---|
| LBA | 0 | 1 | x | x | 2 | 3 | 4 | 5 | x | x |

(b)

| SEC | 0 | 1 | 2 | 3 | 4 | 5 | 6 | 7 | 8 | 9 |
|-----|---|---|---|---|---|---|---|---|---|---|
| LBA | x | x | x | x | 6 | 7 | 8 | 9 | 10 | 11 |

(c)

| SEC | 0 | 1 | 2 | 3 | 4 | 5 | 6 | 7 | 8 | 9 |
|-----|---|---|---|---|---|---|---|---|---|---|
| LBA | 14 | 15 | 16 | 17 | 18 | 19 | 20 | 21 | 22 | 23 |

METHOD FOR REGISTERING, IN A DEFECT MAP, ADDRESSES OF DEFECTIVE SECTORS OF A DATA RECORDING MEDIUM

BACKGROUND OF THE INVENTION

1. Technical Field

The present invention relates to a defect register method for registering each address of defective sectors arising in a data recording medium, such as a disk recording medium, in a defect map, a recording medium in which the defect map is registered and which is computer-readable, and a disk apparatus that refers to the defect map where addresses of defective sectors in the disk recording medium are registered and accesses the disk recording medium.

2. Description of the Related Art

Each surface of a disk (disk recording medium) in a disk apparatus is divided into a plurality of tracks, and each track is divided into a plurality of sectors. The disk apparatus refers to a defect map where addresses of defective sectors are registered, accesses a non-defective sector with a read/write head that is provided for every disk surface, and writes data in the sector or reads data from the sector. The defect map is classified into a primary defect map (PDM) and reassign defect map (RDM).

Each sector in the disk apparatus has an absolute block address (ABA). In addition, each head and disk surface has a head identification number HED, each track on a disk surface has a cylinder identification number CYL, and each sector in a track has a sector identification number SEC. The disk apparatus identifies a track by the HED and CYL.

When formatting a disk, the disk apparatus inspects all sectors, generates a PDM where positional information of defective sectors (initial defective sectors) is registered, and records this PDM in a map recording medium (a system reserve region that is part of the disk, a nonvolatile semiconductor memory apparatus, or the like). A logical block address (LBA) is assigned to a normal sector that is not registered in the PDM. The positional information registered in the PDM is an ABA or false logical block address (F.LBA) of an initial defective sector. The F.LBA is an LBA that would be assigned if the defective sector were normal.

In addition, if a defective sector (a subsequent defective sector) arises after the completion of formatting, the disk apparatus performs alternative processing of this subsequent defective sector. Furthermore, the disk apparatus registers an LBA of the subsequent defective sector and an LBA of an alternative sector in the RDM, and records this RDM in the map recording medium.

FIG. 12 is an example of initial defective sectors in a track that is part of a disk. In FIG. 12, "x" shows an initial defective sector. In addition, let a track having a cylinder identification number CYL and a head identification number HED be T(CYL, HED). T(1, 0) means a track of CYL=1 and HED=0. In addition, ABA are assigned in the order of tracks T(0, 0), T(1, 0), T(2, 0), . . . Furthermore, each sector length (the number of sectors) T.LE of tracks T(0, 0), T(1, 0), T(2,0) is 10. Moreover, FIG. 12 is just a schematic drawing, and the T.LE described above is, for example, 200 to 400 in an actual disk apparatus.

FIGS. 13A to 13C are explanatory diagrams of the structure of PDM generated for the initial defective sectors, shown in FIG. 12, in a conventional disk apparatus.

FIG. 13A shows the PDM where an absolute block address of each initial defective sector (D.ABA) is individually registered.

Nevertheless, since the memory capacity of an entire disk apparatus sharply increases recently, a total number of defective sectors also increases with relation to that. Therefore, a data amount of the PDM in FIG. 13A where each defective sector is individually registered becomes huge. In a current disk recording medium having high recording density, such a probability that defective sectors are continuous is high, and hence a PDM where each series of defective sectors with continuous ABA is registered in a batch by registering a position and sector length (the number of sectors) of the series of defective sectors is devised as shown in FIGS. 13B and 13C.

FIG. 13B shows a PDM where a series of defective sectors consisting of defective sectors with continuous ABA is registered in a batch by registering a first absolute block address of the series of defective sectors (D.ABA.ST), and defective sector length of the series of defective sectors (D.LE). In addition, FIG. 13C shows a PDM where a series of defective sectors consisting of defective sectors with continuous ABA is registered in a batch by registering a false logical block address of the series of defective sectors (F.LBA), and defective sector length of the series of defective sectors (D.LE). In FIGS. 13B and 13C, two defective sectors, which have continuous ABA and have register numbers X of 0 and 1, shown in FIG. 13A, respectively, are registered in a batch at the register number Y=0. Furthermore, four defective sectors, which have continuous ABA and have register numbers X of 2 to 5, shown in FIG. 13A, respectively, are registered in a batch at the register number Y=1.

Furthermore, a data amount of the PDM is reduced by dividing the D.ABA.ST or F.LBA into upper bits and lower bits, registering the upper bits in a virtual track table (VTT), and registering the lower bits and D.LE described above in a virtual sector table (VST).

The disk apparatus obtains a track (CYL and HED where the LBA described above exists), where an LBA that the disk apparatus is requested by a host system to access exists, with referring to the PDM. Next, the disk apparatus generates an ID table (a table for associating a SEC of each sector and the LBA assigned) of this track with referring to the PDM. Then, by referring to this ID table, the disk apparatus accesses the sector having the LBA requested. In addition, if the alternative processing was performed to the LBA requested, the disk apparatus accesses its alternative sector with referring to the RDM.

The processing to assign an LBA is just the processing of generating an ID table with referring to a PDM. It is conceivable that after generating the PDM, the disk apparatus generates the ID table of all the tracks and records this ID table of all the tracks in a system reserve region and the like. Nevertheless, since a data amount of the ID table of all the tracks is huge, it is not desirable to record the ID table of all the tracks in a system reserve region and the like. For this reason, the disk apparatus generates an ID table of a track, being accessed, on each occasion. If the contents of the PDM are the same, an ID table having the same contents is generated for every access.

Nevertheless, in the conventional PDM where the initial defective sectors with continuous ABA are registered in a batch, there is such a possibility that a normal sector that is not registered in a PDM is erroneously made to be defective when an LBA is assigned by generating an ID table of a track. Therefore, in order to avoid such a case, it becomes necessary to impose a burden on another mechanism such as modification of a disk controller (hardware comprising a logic circuit and a counter circuit), or defect correction by a micro processing unit (MPU). Thus, even if a data amount of the PDM can be reduced, it is obliged to modify another mechanism for the sake of that, and complicated processing is required.

FIGS. 14A to 14C are explanatory diagrams of track ID tables generated for initial defective sectors, shown in FIG. 12, in a conventional disk apparatus. FIG. 14A shows an ID table of the track T(0, 0), FIG. 14B shows an ID table of the track T(1, 0), and FIG. 4C shows an ID table of the track T(2, 0). In addition, "x" represents a SEC to which an LBA is not assigned.

If a series of initial defective sectors passing over tracks is registered in a batch in a PDM, it arises that an LBA is not assigned to each of sectors in spite of the sectors being not registered in the PDM. For example, if a series of initial defective sectors passing over tracks such as the initial defective sectors having ABA=8, . . . , 11 in FIG. 12 is registered in a batch at the register number Y=1 in the PDM shown in FIG. 13C, the ID table of the track T(1, 0) is generated as shown in FIG. 14B. Therefore, normal sectors having ABA=12, 13 are made to be defective.

An ID table is generated by a control unit of a disk apparatus. This control unit comprises an MPU and a disk controller (hardware comprising a logic circuit, a counter circuit, and the like). The MPU obtains a minimum logical block address in a track (MIN.LBA) and sector length (the number of sectors) in the track (T.LE). In addition, the MPU discriminates register numbers in the PDM to refer to, sends these as ID table information to the disk controller, and instructs generation of ID tables.

In regard to an ID table of the track T(0, 0), the disk controller generates the ID table as shown in FIG. 14A according to such ID table information that the MIN.LBA is 0, T.LE is 10, and the register number Y in the reference PDM is 0.

In this case, the disk controller assigns MIN.LBA=0 to the sector with SEC=0, and assigns LBA=1 to the sector with SEC=1. Next, since F.LBA=2 and D.LE=2 are registered at the register number Y=0 in the PDM shown in FIG. 13C, the disk controller assigns LBA=2 to the sector with SEC=4 with skipping the sectors SEC=2 and 3. Then the disk controller increments the register number Y to 1. Next, the disk controller assigns LBA=3, 4, 5 respectively to the sectors SEC=5 to 7 in order. Furthermore, since F.LBA=6 and D.LE=4 are registered at the register number Y=1 in the PDM shown in FIG. 13C, the disk controller skips the sections SEC=8 and 9. Since the sector with SEC=9 is the end sector of the track (EOT: End Of Track) T(0, 0), the disk controller finishes the generation of the ID table of the track T(0, 0) after skipping the sector with SEC=9.

In addition, in regard to an ID table of the track T(1, 0), the disk controller generates the ID table as shown in FIG. 14B according to such ID table information that the MIN.LBA is 6, T.LE is 10, and the register number Y in the reference PDM is 1.

In this case, since F.LBA=6 and D.LE=4 are registered at the register number Y=1 in the PDM shown in FIG. 13C, the disk controller assigns MIN.LBA=6 to the sector with SEC=4 with skipping the sectors SEC=0 to 3. For this reason, the disk controller does not assign LBA to normal sectors SEC=2 and 3 that are not registered in the PDM. After this, the disk controller assigns LBA=6, . . . , 11 respectively to the sectors SEC=4 to 9 in order. Since the sector with SEC=9 is an EOT, the disk controller finishes the generation of the ID table of the track T(1, 0) after assigning LBA=11 to the sector with SEC=9.

In addition, in case of an ID table of the track T(2, 0), the disk controller generates the ID table as shown in FIG. 14C according to such ID table information that MIN.LBA is 14, T.LE is 10, and the register number Y in the reference PDM is 2.

Up to the sector with SEC=7 in the track T(0, 0), discrepancy between the ABA and LBA is equal to the number of initial defective sectors existing before the sector, and hence it is possible to obtain the discrepancy by simply accumulating the defective sector length D.LE in the PDM. Nevertheless, after the sector with SEC=4 of the track T(1, 0), it should be performed to consider the number of sectors that are not registered in the PDM and that LBA are not assigned to, so as to obtain the discrepancy between the ABA and LBA.

In order to obtain a track where an LBA that the disk apparatus is requested by a host system to access exists, the control unit transforms the LBA described above into an ABA with referring to the PDM, and transforms this ABA into CHS (CYL, HED, and SEC) by calculation.

For example, if transforming the LBA=10 into an ABA, the control unit transforms F.LBA[0]=D.ABA.ST[0]=2 (at Y=0, F.LBA=D.ABA.ST) into CHS with reference to Y=0 in the PDM shown in FIG. 13C. Furthermore, the control unit judges whether the series of defective sectors at Y=0 passes over tracks. In this case, since the series of defective sectors does not pass over the tracks, the control unit judges that the discrepancy between the ABA and LBA due to the series of defective sectors at Y=0 is equal to D.LE[0]=2.

Next, the control unit transforms F.LBA[1]=6 into the D.ABA.ST with referring to Y=1 in the PDM shown in FIG. 13C. In consequence, D.ABA.ST[1]=F.LBA[1]+D.LE[0]=8. Furthermore, the control unit transforms D.ABA.ST[1]=8 into a CHS, and judges whether the series of defective sectors at Y=1 passes over tracks. In this case, the series of defective sectors passes over the tracks T(0, 0) and T(1, 0), and two sectors out of four defective sectors at Y=1 exist in the track T(1,0). Hence the control unit judges that the discrepancy between the ABA and LBA due to the series of defective sectors at Y=1 is D.LE[1]+2=4.

Therefore, the control unit adds D.LE[0]+D.LE[1]+2=8 to the LBA whose value is 10, and judges that the ABA of the LBA whose value is 10 is 18.

In this manner, when an ID table is generated with referring to such a conventional PDM that a series of initial defective sectors with continuous ABA is registered in a batch, LBA may not be assigned to sectors that are not defective if there is a series of defective sectors passing over tracks. In addition, if the control unit refers to the conventional PDM, the control unit should judge whether each series of defective sectors registered in the PDM passes over tracks when performing the LBA/ABA transformation and ABA/LBA transformation. Therefore, since the control unit should also perform the ABA/CHS transformation for this judgment, the LBA/ABA transformation and ABA/LBA transformation become complicated.

It is possible to make the disk controller or MPU judge whether a series of defective sectors having a PDM register number (a reference PDM register number that is included in ID table information sent from the MPU) to which the disk controller first refers when generating the ID table passes over tracks. Owing to this, it is not impossible to avoid the occurrence of a sector to which an LBA is not assigned in spite of a normal sector even if the series of defective sectors passes over tracks.

Nevertheless, in a current disk apparatus, since multi-zone recording or banded zone format is adopted, the calculation of the ABA/CHS transformation is complicated. Therefore, it is not realistic to make the disk controller, which is hardware, judge whether a series of defective sectors having a PDM register number to which the disk controller first refers passes over tracks. In addition, it should be performed for every generation of an ID table to judge whether a series of defective sectors having a PDM register number to which the disk controller first refers passes over tracks. Therefore, although it is possible to make the MPU perform this, the calculation by the MPU is inserted for every generation of an ID table. Hence, since command overhead (time from when a disk apparatus receives a command from a host system to when the disk apparatus starts accessing a medium) becomes large, the performance of the disk apparatus decreases.

In addition, the multi-zone recording is a method for locating sectors so that the number of sectors per track may become larger as a zone is nearer to the outer edge of a disk, by dividing a disk surface into a plurality of zones and changing the number of sectors per track for every zone. Furthermore, the banded zone format is a method for assigning ABA sequentially from an outmost band so that the number of head changes may become the fewest, by dividing a disk into a plurality of bands (one band is composed of, for example, 64 cylinders).

Moreover, in an RDM, it is necessary to register not only an LBA of a subsequent defective sector, but also an LBA of the corresponding alternative sector. For this reason, if the above-described conventional defect map in which a series of defective sectors that is continuous is registered in a batch is applied to the RDM, LBA of the corresponding alternative sectors are not always continuous even if LBA of the subsequent defective sectors are continuous. Therefore, registration contents of the alternative sectors become complicated. For this reason, the processing when the control unit accesses the alternative sectors with referring to the RDM becomes complicated.

As described above, in the conventional defect map, there are themes to be pursued in regard to increasing process performance at the time of a disk access as follows: (1) to eliminate a disadvantage of erroneously making a normal sector defective, and (2) to simplify the processing of generating an ID table.

SUMMARY OF THE INVENTION

An object of the present invention is to provide defect map structure that can increase the process capability of a recording apparatus when accessing a data recording medium.

In order to achieve the above object, a defect register method according to the present invention comprises the steps of:

(A) discriminating a series of defective sectors consisting of a plurality of defective sectors with continuous addresses, the plurality of defective sectors meeting a predetermined condition with respect to a partial region where the defective sectors are located or alternative sectors which correspond to the defective sectors, and (B) registering the series of defective sectors in a defect map by registering a first address and sector length of the series of defective sectors.

Further, specifically, the step (A) is a step of discriminating a series of defective sectors consisting of a plurality of defective sectors with continuous addresses, the plurality of defective sectors that exist in the same partial region.

Alternatively, the step (A) is a step of discriminating a series of defective sectors consisting of a plurality of defective sectors with continuous addresses, the plurality of defective sectors whose alternative sectors have continuous addresses.

Furthermore, the step (B) is a step of registering in a defect map the series of defective sectors and a series of alternative sectors that correspond to the series of defective sectors by registering each first address and sector length of the series of defective sectors and the corresponding series of alternative sectors.

A defect map recording medium according to the present invention records a defect map where a series of defective sectors consisting of a plurality of defective sectors with continuous addresses, the plurality of defective sectors meeting a predetermined condition with respect to a partial region where the defective sectors are located or alternative sectors which correspond to the defective sectors, is registered by a first address and sector length of the series of defective sectors being registered.

Further, specifically, the defect map recording medium described above records a defect map where a series of defective sectors consisting of a plurality of defective sectors with continuous addresses, the plurality of defective sectors which exist in the same partial region, is registered by registering a first address and sector length of the series of defective sectors.

Alternatively, the defect map recording medium described above records a defect map where a series of defective sectors consisting of a plurality of defective sectors with continuous addresses, the plurality of defective sectors whose alternative sectors have continuous addresses, and the series of alternative sectors which correspond to the defective sectors are registered by registering each first address and sector length of the series of defective sectors and the corresponding series of alternative sectors.

A disk apparatus according to the present invention comprises a disk recording medium which is divided into a plurality of tracks each of which is divided into a plurality of sectors, a defect map storage medium where a defect map where addresses of defective sectors in the disk recording medium are registered is recorded, disk access means for writing data into and reading data from the sectors in the disk recording medium, and disk access control means for referring to the defect map and making the disk access means access normal sectors, wherein a series of defective sectors consisting of a plurality of defective sectors with continuous addresses, the plurality of defective sectors which exist in the same track, is registered in the defect map by a first address and sector length of the series of defective sectors being registered.

In addition, another disk apparatus according to the present invention comprises a disk recording medium which is divided into a plurality of tracks each of which is divided into a plurality of sectors, a defect map storage medium where a defect map where positions of defective sectors in the disk recording medium are registered is recorded, disk access means for writing data into and reading data from the sectors in the disk recording medium, and disk access control means for referring to the defect map and making the disk access means access normal sectors, wherein a series of defective sectors consisting of a plurality of defective sectors with continuous addresses, the plurality of defective sectors whose alternative sectors have continuous addresses, and a series of alternative sectors which correspond to the defective sectors are registered in the defect map by each first address and sector length of the series of defective sectors and the corresponding series of alternative sectors being registered.

BRIEF DESCRIPTION OF THE DRAWINGS

FIG. 4 is an example of initial defective sectors having arisen in a track that is part of a disk;

FIGS. 5A to 5C are explanatory diagrams of the structure of PMD generated for the initial defective sectors, shown in FIG. 4, in a disk apparatus according to an embodiment of the present invention;

FIGS. 7A to 7C are explanatory diagrams of track ID tables generated for the initial defective sectors, shown in FIG. 4, in a disk apparatus according to an embodiment of the present invention;

FIGS. 8A1 to 8B2 are explanatory diagrams each showing the structure of a batch register PDM, divided into VTT and VST, in a disk apparatus according to an embodiment of the present invention;

FIG. 9 is an example of subsequent defective sectors in a track that is part of a disk;

FIGS. 10A to 10D are explanatory diagrams each showing the structure of an RMD generated for the subsequent defective sectors, shown in FIG. 9, in a disk apparatus according to an embodiment of the present invention;

FIGS. 13A to 13C are explanatory diagrams of the structure of PMD generated for the initial defective sectors, shown in FIG. 12, in a conventional disk apparatus; and FIGS. 14A to 14C are explanatory diagrams of track ID tables generated for the initial defective sectors, shown in FIG. 12, in a conventional disk apparatus.

DETAILED DESCRIPTION OF A PREFERRED EMBODIMENT

Figure 1:
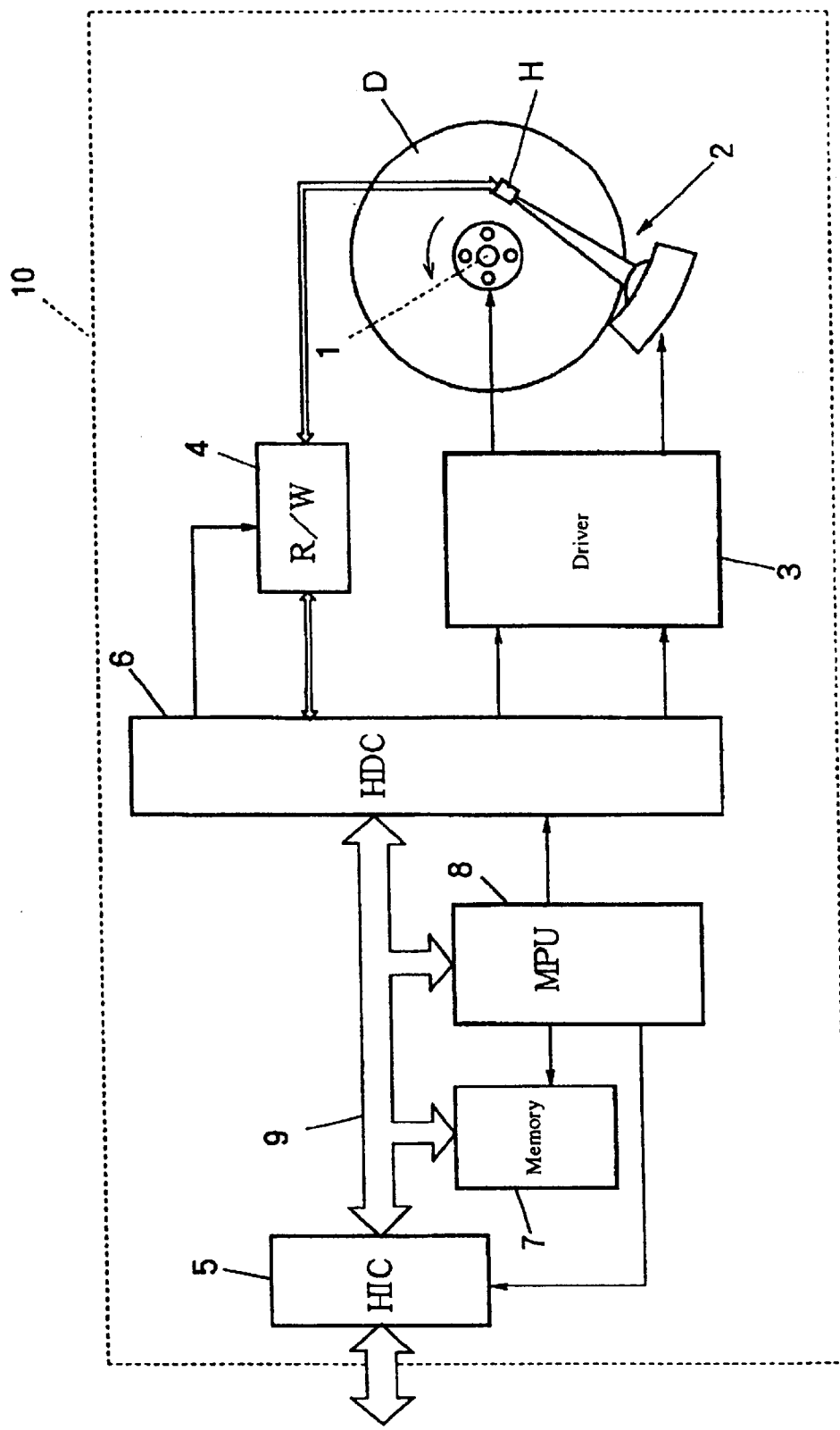
FIG. 1 is a block diagram showing a disk apparatus according to an embodiment of the present invention.

FIG. 1 shows a block diagram showing a disk apparatus according to an embodiment of the present invention. A disk apparatus 10 in FIG. 1 comprises a magnetic disk D that is a recording medium, a head H writing data into or reading data from the disk D, a spindle motor 1 rotating the disk D, an actuator 2 supporting the head H and moving the head H in the radial direction of the disk D, a driver module 3 driving the spindle motor 1 and actuator 2, a read/write (R/W) channel module 4, a host interface controller (HIC) 5, a hard disk controller (HDC) 6, memory 7, a micro processing unit (MPU) 8, and a bus 9 mutually connecting the HIC 5, HDC 6, memory 7, and MPU 8.

Figure 2:
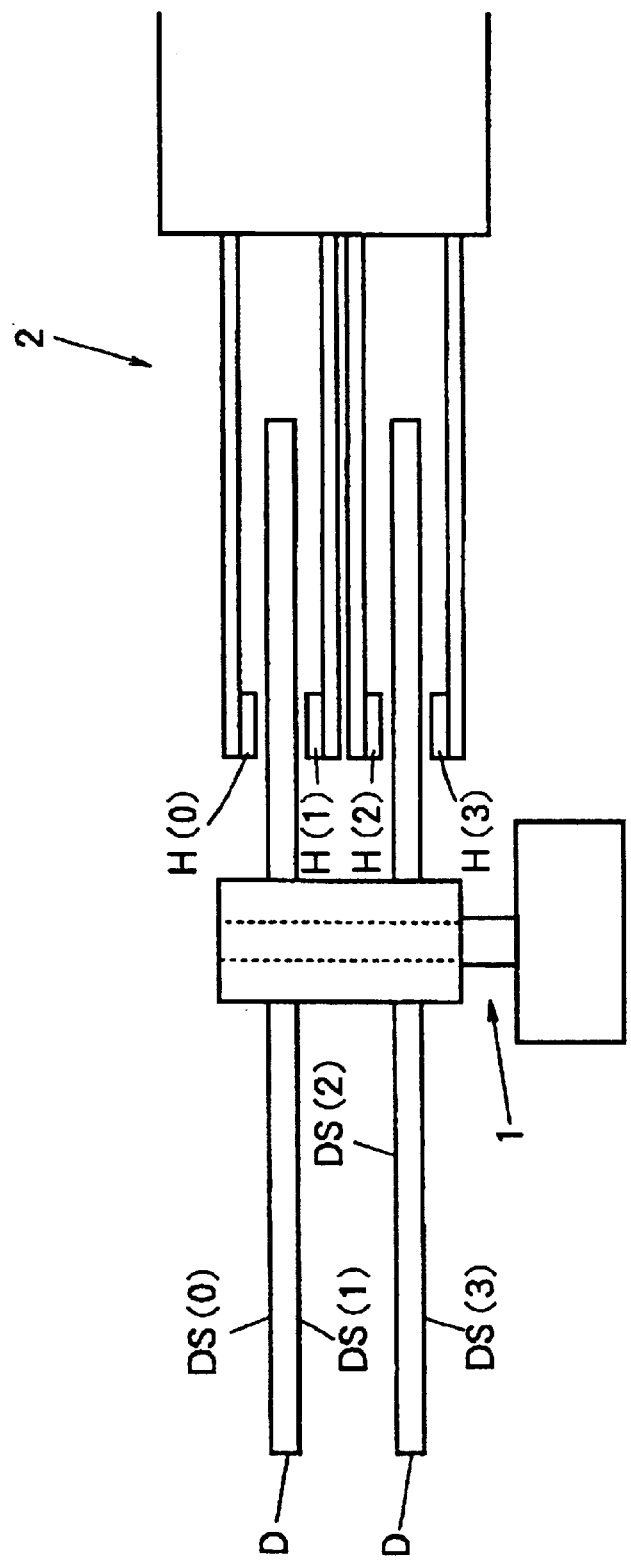
FIG. 2 is a structural drawing of a periphery of a disk apparatus according to an embodiment of the present invention.

FIG. 2 is a structural drawing of a periphery of the disk apparatus 10. The magnetic disk D consisting of one or more sheets of disks is fixedly installed on the spindle motor 1 (two sheets of disks in FIG. 2), and rotates with the spindle motor 1 in one piece when the spindle motor 1 is driven by the driver module 3. In addition, the head H is installed at an end of an arm of the actuator 2, rotates with the actuator 2 in one piece when the actuator 2 is driven by the driver module 3, and moves above the disk D in the radial direction of the disk D. The disk D can record data on both disk surfaces DS of each disk sheet. In addition, the head H is provided for every disk surface DS.

Figure 3:
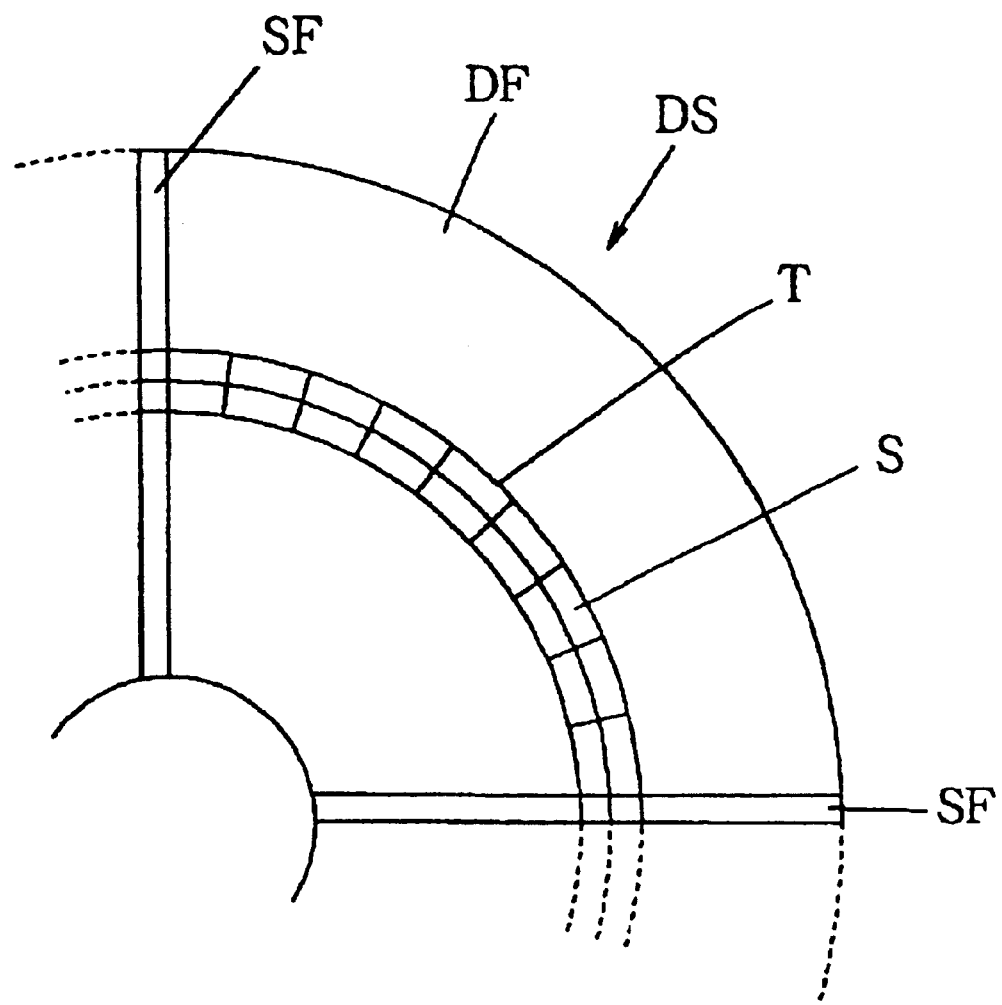
FIG. 3 is a structural drawing of a disk surface in a disk apparatus according to an embodiment of the present invention.

FIG. 3 is a structural drawing of the disk surface DS. As shown in FIG. 3, the disk surface DS is divided into plenty of tracks T that are concentric. In addition, the disk surface DS is divided into data fields DF, where data is recorded, and servo fields SF.

Each of heads H and disk surfaces DS has a head identification number (side identification number) HED (=0, 1, 2, ... ). Let a head H having a head identification number HED be H(HED), and let a disk surface DS having the head identification number HED be DS(HED).

Each track T on an arbitrary disk surface DS(HED) has a cylinder identification number CYL (=0, 1, 2, ... ). Since a plurality of tracks T with the same cylinder identification number on each disk surface DS are positioned at the same radius, it is as if they formed a cylinder. Let a track T having a head identification number HED and a cylinder identification number CYL be T(HED, CYL).

A data field DF in an arbitrary track T(HED, CYL) is divided into plenty of sectors S for recording data. These sectors S are located in the longitudinal direction of the track T. Each sector S in the arbitrary track T(HED, CYL) has a sector identification number SEC (=0, 1, 2, ... ).

Each sector S of the one or more sheets of disk D has an absolute block address ABA. In addition, each normal sector, except sectors which are judged defective in disk formatting among sectors S of the one or more sheets of disk D, has a logical block address LBA. An ABA and an LBA correspond to one of CHS (combination of CYL, HED, and SEC). The ABA and LBA are, for example, 28-bit data.

In a servo field SF, a servo pattern (a cylinder identification number CYL, a burst pattern, and a track start pattern) for positioning a head H above a track T of interest and accessing a sector S of interest is recorded. In a servo field SF in an arbitrary track T(HED, CYL), a cylinder identification number CYL of the track is recorded. In addition, a burst pattern for positioning a head H above a track T of interest and making the head H follow the track T is recorded in each servo field SF. Furthermore, a track start pattern for identifying a track start position is recorded in any one of servo fields SF.

The R/W channel module 4 selects any one of heads H (selects any one of a plurality of read/write channels between a plurality of heads H), and converts write data, inputted from the HDC 6, into an analog signal to send the signal to the head H selected. The write data described above is written in the sector S by the head H selected. In addition, the R/W channel module 4 shapes and amplifies a signal read from a disk surface DS by the head H selected, and further converts the signal into digital data according to necessity to send the signal to the HDC 6. The signal being read includes a read signal of data recorded in the sector S, and a read signal of a servo pattern.

The HIC 5 receives a read/write command, write data to the disk D, and the like, which are sent from an external host system, according to an instruction from the MPU 8, and transfers read data from the disk D, and the like to the host system.

The memory 7 stores part of micro code (control program) executed by the MPU 8, data, parameters, tables, maps, and the like necessary for the MPU 8 controlling the disk apparatus. The control program and the like are recorded in a nonvolatile memory region provided in the MPU 7. Alternatively, the control program and the like are stored in a system reserve region that is secured beforehand in part of the disk surface DS, and are read in a volatile memory region of the memory 7 from the system reserve region when the disk apparatus is activated.

In the maps described above, defect maps (PDM and RDM) are included. Therefore, the PDM and RDM are recorded in the system reserve region of the disk surface DS or the nonvolatile memory region of the memory 7.

The PDM is generated when the disk apparatus is manufactured, and is also generated as positional information of defective sectors (hereinafter, initial defective sectors) when disk formatting is performed according to necessity after shipping.

In addition, the RDM is generated as the information for associating an LBA of a subsequent defective sector with an LBA of an alternative sector when a defective sector not to be normally accessed (hereinafter, a subsequent defective sector) at the time of a disk access after disk formatting arises and alternative processing is performed.

Although an LBA is not assigned to an initial defective sector, an LBA is assigned to a subsequent defective sector. An LBA different from that of a subsequent defective sector is assigned to an alternative sector. The register contents of the PDM generated at the time of disk formatting are never modified and added after disk formatting. On the contrary, alternative information of a subsequent defective sector is added to the RDM every time the subsequent defective sector arises and the alternative processing is performed.

The disk formatting described above is the processing of initializing (formatting) data fields of a disk. In addition, the alternative processing described above is the processing of securing an unused sector that is located in an alternative track and substituting the subsequent defective sector with this alternative sector. If an access to the subsequent defective sector is requested after the alternative processing, the disk apparatus accesses the alternative sector. In addition, the disk access described above is classified into a write access of writing data in a sector that is requested by a write command, and a read access of reading data from a sector, which is requested by a read command.

The MPU 8 controls the HIC 5 and HDC 6 according to the micro code described above. In addition, the HDC 6 controls the driver module 3 and R/W channel module 4 according to an instruction from the MPU 8.

The HDC 6 and MPU 8 constitute a control unit. The control unit controls disk formatting and generates a PDM. In addition, the control unit generates an ID table of a track, being accessed, with referring to the PDM, and controls a disk access with referring to this ID table and an RDM. Furthermore, the control unit controls alternative processing, and adds information about alternative processing to the RDM.

The track ID table described above is a table for associating a sector identification number SEC of each sector in a track with a logical block address LBA. This track ID table is temporarily held in a register provided inside the MPU 8 or HDC 6, or the memory 7.

A generation procedure of the PDM by the disk apparatus 10 according to the present embodiment will be described below. When disk formatting is performed at the time of manufacturing a disk apparatus and the like, the control unit:

[A] detects initial defective sectors by inspecting all sectors for whether the control unit can normally access each sector, and generates a PDM where the control unit registers each absolute block address D.ABA of the initial defective sectors individually;

[B] discriminating a series of defective sectors consisting of a plurality of initial defective sectors with continuous D.ABA, which exist in the same track (the track having the same cylinder identification number CYL and head identification number HED), from the individual register PDM described above, and generating a PDM where the control unit registers this series of defective sectors in a batch by registering a first address and defective sector length (the number of defective sectors) of the series of defective sectors; and

[C] records the batch register PDM in a system reserve region of the disk surface DS or the nonvolatile memory region of the memory 7.

The step [B] described above comprises:

[B1] a step of discriminating a series of defective sectors consisting of a plurality of initial defective sectors with continuous D.ABA, which exist in the same track, from the individual register PDM, and generating a PDM (PDM-A) where the control unit registers this series of defective sectors in a batch by registering a first absolute block address ABA.ST and defective sector length D.LE of the series of defective sectors; and

[B2] a step of generating a PDM (PDM-B) where the control unit registers the series of defective sectors described above in a batch by registering a false logical block address F.ABA and defective sector length D.LE of the series of defective sectors, from the PDM-A.

The false logical block address F.LBA corresponds to an LBA that would be assigned to this sector if the initial defective sector were normal. Therefore, the value of the F.LBA of each initial defective sector constituting the series of initial defective sectors described above is the same.

FIG. 4 is an example of initial defective sectors having arisen in a track that is part of a disk. In FIG. 4, "x" shows an initial defective sector. In FIG. 4, ABA are assigned to tracks T(0(=CYL), 0(=HED)), T(1, 0), T(2, 0), . . . in this order. In addition, each sector length T.LE (the number of sectors) of tracks T(0, 0) to T(2, 0) is assumed to be 10. Furthermore, each LBA that is assigned to each sector is put down with each ABA. Moreover, in FIG. 4, an SOT represents a track start sector (Start Of Track), an EOT does a track end sector (End Of Track), an SOR does a first sector in an LBA block which the host system requests the disk apparatus to access (Start Of Request), and an EOR does a last sector in the LBA block which the host system requests the disk apparatus to access (End Of Request) In addition, FIG. 4 is just a schematic drawing, and hence the T.LE and the like are different from those of an actual disk apparatus.

FIGS. 5A to 5C are explanatory diagrams of the structure of PMD generated for the initial defective sectors, shown in FIG. 4, in a disk apparatus according to an embodiment of the present invention. In FIGS. 5A to 5C, FIG. 5A shows the PDM where each absolute block address D.ABA of initial defective sectors is registered individually. FIG. 5B shows the PDM (PDM-A) where a series of initial defective sectors with continuous addresses in the same track is registered in a batch by a first absolute block address D.ABA.ST and defective sector length D.LE of the series of initial defective sectors being registered. Furthermore, FIG. 5C shows the PDM (PDM-B) where a series of initial defective sectors with continuous addresses in the same track is registered in a batch by a false logical block address F.LBA and defective sector length D.LE of the series of initial defective sectors being registered.

The batch register PDM-A is generated from the individual register PDM. In the batch register PDM-A, even if D.ABA are continuous, initial defective sectors whose tracks (CYL or HED) are different from each other are registered separately. In addition, the batch register PDM-B is generated by the D.ABA.ST of the batch register PDM-A being transformed into F.LBA. The batch register PDM-B has the structure of a final PDM (a PDM recorded in the system reserve region or the memory 7). In addition, the PDM-A can be the final PDM.

The control unit inspects all sectors for whether the control unit can normally access all the sectors when the disk formatting is performed at the time of manufacturing the disk apparatus and the like, and generates the individual register PDM as shown in FIG. 5A. In the individual register PDM shown in FIG. 5A, two initial defective sectors (D.ABA=2, 3) with continuous D.ABA that exist in the track T(0, 0) are individually registered at the register numbers X=0, 1 respectively. In addition, four initial defective sectors (D.ABA=8, . . . , 11) with continuous D.ABA that exist over the tracks T(0, 0) and T(1, 0) are individually registered at the register numbers X=2, . . . , 5 respectively.

Next, the control unit generates the batch register PDM-A as shown in FIG. 5B from the individual register PDM. Thus, the control unit discriminates a series of defective sectors, which has continuous D.ABA.ST and exists in the same track, from the individual register PDM. Furthermore, the control unit generates the PDM-A where the control unit registers this series of defective sectors in a batch by registering a first absolute block address D.ABA.ST and sector length D.LE of the series of defective sectors. In the batch register PDM-A shown in FIG. 5B, two defective sectors with continuous D.ABA at the register numbers X=0, 1 in FIG. 5A are registered in a batch at the register number Y=0. In addition, two defective sectors with continuous D.ABA at the register numbers X=2, 3 which exist in the track T(0, 0) among four defective sectors with continuous D.ABA at the register numbers X=2, . . . , 5 in FIG. 5A are registered in a batch at the register number Y=1. Furthermore, two defective sectors with continuous D.ABA at the register numbers X=4, 5 that exist in the track T(1, 0) are registered in a batch at the register number Y=2.

In a conventional batch register PDM (see FIG. 13B), a series of defective sectors (D.ABA=8, . . . , 11) with continuous D.ABA that passes over the tracks T(0, 0) and T(1, 0) is registered in a batch. Nevertheless, in the batch register PDM (see FIG. 5B) according to the present embodiment, the series of defective sectors (D.ABA=8, . . . , 11) with continuous D.ABA is divided into the series of defective sectors (D.ABA=8, 9) existing in the track T(0, 0) and the series of defective sectors (D.ABA=10, 11) existing in the track T(1, 0), and both series are registered individually.

Figure 6:
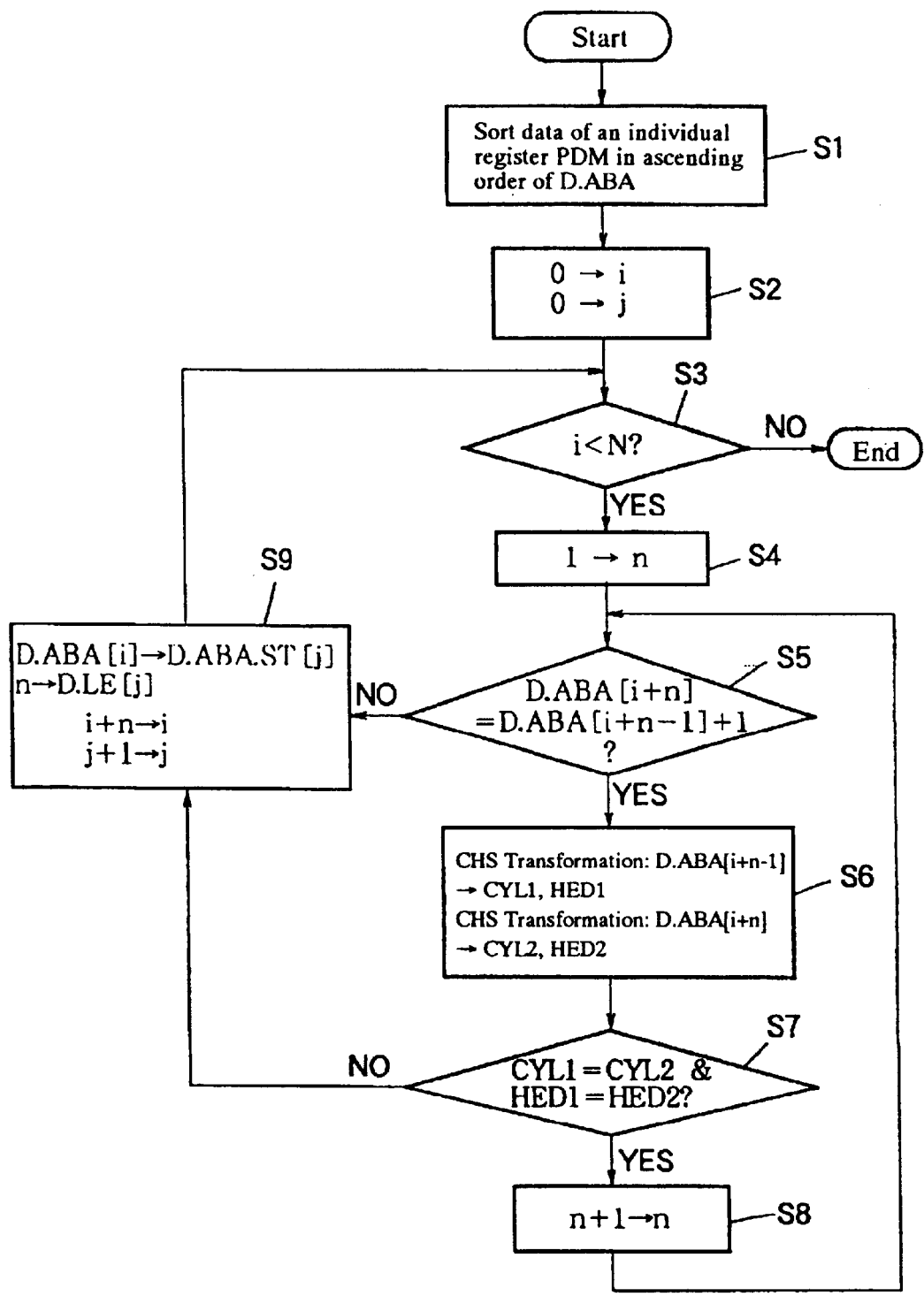
FIG. 6 is a flow chart for describing a procedure for generating a batch register PDM from an individual register PDM in a disk apparatus according to an embodiment of the present invention.

FIG. 6 is a flow chart for describing a procedure for generating the batch register PDM-A from an individual register PDM in the disk apparatus according to the embodiment of the present invention. In the description of the procedure in FIG. 6, ABA of N series of initial defective sectors having the register numbers X=0, 1, 2, . . . , N−1 are registered respectively in the individual register PDM (see FIG. 5A). Let the D.ABA registered at the register number X in the PDM-A be D.ABA[X].

At step S1 in FIG. 6, the control unit sorts initial defective sectors, registered in the individual register PDM, in ascending order so that the D.ABA may become large as the register number X becomes large.

After this, by the processing at step S2 and subsequent steps, the control unit discriminates a series of initial defective sectors with continuous D.ABA, and further judging whether this series of initial defective sectors passes over tracks. Owing to this, the control unit generates the PDM-A (see FIG. 5B) where the control unit registers in a batch the series of defective sectors with continuous D.ABA, which exists in the same track, by registering a first absolute block address D.ABA.ST and sector length D.LE of the series of initial defective sectors. Let the D.ABA.ST registered at the register number Y in the PDM-A be D.ABA.ST[Y], and let D.LE be D.LE[Y].

At step S2, it is performed that a value of a variable i for counting the register number X in the individual register PDM, and a value of a variable i for counting the register number Y in the PDM-A are set at 0. Furthermore, at step S3, it is judged whether the value of the variable i is smaller than the number N of the defective sectors (the number of defective sectors registered in the individual register PDM), that is, whether i<N. If i<N, the process goes to step S4, and further goes to step S5 after the value of the variable n for counting the defective sector length is set at 1. In addition, if i=N in the step S3, the control unit finishes the generation of the PDM.

At step S5, the control unit judges whether D.ABA[i+n] in the individual register PDM is equal to the value obtained by adding 1 to D.ABA[i+n−1] registered at the register number just before the register number. Thus, it is judged whether D.ABA[i+n−1] and D.ABA [i+n] are continuous.

If D.ABA[i+n]=D.ABA[i+n−1]+1 in the step S5, the process goes to step S6. In addition, D.ABA[i+n]≠D.ABA [i+n−1]+1, the process goes to step S9.

At step S6, the control unit transforms each of D.ABA [i+n−1] and D.ABA[i+n] into CHS (cylinder number CYL, head number HED, and sector number SEC), and the process goes to step S7. It is assumed that the cylinder number of D.ABA[i+n−1] is CYL1 and the head number is HED1. In addition, it is assumed that the cylinder number of D.ABA[i+n] is CYL2 and the head number is HED2.

At step S7, the control unit judges whether CYL1=CYL2 and HED1=HED2. Thus, it is judged whether D.ABA[i+n−1] and D.ABA[i+n] that are continuous exist in the same track. Then, if CYL1=CYL2 and HED1=HED2 in the step S7, the control unit increments the variable n by 1 at step S8, and the process returns to the step S5. In addition, if CYL1≠CYL2 or HED1≠HED2 in the step S7, the process goes to the step S9.

In the step S9, the control unit registers D.ABA[i] in the individual register PDM as a first address of the series of defective sectors at the register number Y=j in the batch register PDM-A, D.ABA.ST[j], and registers a value of the variable n as the sector length of the series of defective sectors at the register number Y=j in the batch register PDM-A, D.LE[j]. Furthermore, the control unit increments the variable i by n, and increments the variable i by 1. Then, the process returns to the step S3. Owing to the above procedure, the PDM-A is generated.

Next, the control unit generates the batch register PDM-B as shown in FIG. 5C from the batch register PDM-A. Thus, the control unit transforms a D.ABA.ST in the batch register PDM-A into a false logical block address F.LBA, and generates in a batch the PDM-B where the series of initial defective sectors with continuous D.ABA, which exists in the same track, by registering the false logical block address F.LBA and sector length D.LE of the series of initial defective sectors. Let the F.LBA registered at the register number Y in the PDM-B shown in FIG. 5C be F.LBA[Y]. In the batch register PDM-B shown in FIG. 5C, D.ABA.ST[1]=8 that is shown in FIG. 5B is transformed into F.LBA[1]=D.ABA.ST[1]−D.LE[0]=6, and D.ABA.ST[2]=10 that is shown in FIG. 5B is transformed into F.LBA[2]= D.ABA.ST[2]−D.LE[0]−D.LE[1]=6. Thus, both D.ABA.ST[1] and D.ABA.ST[2] are transformed into F.LBA=6. In addition, D.ABA.ST[3]=21 that is shown in FIG. 5B is transformed into F.LBA[3]=D.ABA.ST[3]−D.LE[0]−D.LE[1]−D.LE[2]=15.

A procedure of a disk access will be described below. The disk access comprises:

[a] a step of discriminating a track where a sector (from an SOR to an EOR), to which an LBA that the disk apparatus is requested to access is assigned, exists, and generating ID table information consisting of a minimum logical block address MIN.LBA and sector length (the number of sectors) T.LE of the track, and a reference register number in the PDM;

[b] a step of generating an ID table of the track by the HDC 6 according to the ID table information; and

[c] a step of accessing the sector, which the disk apparatus is requested to access and which exists in the track described above, with referring to the ID table. If sectors that the disk apparatus is requested to access exist in a plurality of tracks, the steps [a] to [c] are executed for every track. An ID table of each track is generated in order. It is possible to easily obtain MIN.LBA of second and subsequent tracks from each ID table of a track just before the track of interest.

In the description of the following disk access procedure, it is assumed that a host system requests the disk apparatus 10, having the track structure shown in FIG. 4 and the batch register PDM-B shown in FIG. 5C, to access 10 sectors with LBA=10, ..., 19. In this case, the host system transmits to the disk apparatus a logical block address of a start sector SOR of the sectors that the disk apparatus is requested to access, LBA[SOR]=10, and sector length of the sectors that the disk apparatus is requested to access, R.LE=10, after a write command or a read command. As shown in FIG. 4, the SOR exists in the SEC whose value is 6 in the track T(1, 0), and a track end sector EOR of the sectors that the disk apparatus is requested to access exists in the SEC whose value is 6 in the track T(2, 0).

In the step [a], from such access request information sent from the host system that LBA[SOR]=10 and R.LE=10, the MPU 8 can recognize that the logical block address of the end sector EOR of the sectors that the disk apparatus is requested to access, LBA[EOR] is 19, and that the disk apparatus is requested to access 10 sectors with LBA 10, ..., 19. Nevertheless, the MPU 8 cannot recognize each CYL, HED, and SEC of 10 sectors from the SOR to the EOR.

Then, the MPU 8 transforms LBA[SOR]=10 into an ABA with referring to the PDM in FIG. 5C, and transforms the absolute block address of this SOR, ABA[SOR] into CHS (CYL, HED, SEC). Owing to this, the MPU 8 obtains the track where LBA[SOR] exists.

First, the MPU 8 refers to the PDM in FIG. 5C, and transforms LBA[SOR]=10 into ABA[SOR]. In this case, there is no sector that does not have an LBA even though the sector is normal (this will be described later in detail). Therefore, the MPU 8 can obtain ABA[SOR] by retrieving (a series of) initial defective sectors, a value of F.LBA of which is LBA[SOR]=10 or smaller, from the PDM, obtaining the sum of sector length D.LE of these (series of) initial defective sectors, and simply adding this sum to LBA[SOR]. Since the register numbers Y where F.LBA whose LBA are 10 or smaller are registered are 0, 1, and 2, ABA[SOR]=16.

Next, the MPU 8 transforms ABA[SOR]=16 into the CHS. ABA[SOR]=16 is transformed into CYL=1, HED=0, and SEC=6. The MPU 8 recognizes that LBA[SOR] whose value is 10 exists in the track T(1, 0).

Furthermore, in the step [a], the MPU 8 calculates the sector length of the track T(1, 0), T.LE. In addition, the MPU 8 obtains a MIN.LBA of this track with referring to the PDM in FIG. 5C. Furthermore, the MPU 8 selects a PDM register number to which the MPU 8 makes the HDC 6 refer when the MPU 8 generates the ID table.

First, the MPU 8 calculates the sector length of the track T(1, 0), T.LE. In consequence, T.LE=10.

In addition, if a (series of) initial defective sector(s) registered exists in a track (a track earlier in the order of ABA assigned) before the track T(1, 0) when the MPU 8 refers to the PDM in FIG. 5C, the MPU 8 obtains the MIN.LBA of the track T(1, 0) in consideration of shifting of LBA due to its (series of) defective sector(s).

In order to obtain the MIN.LBA, first, the MPU 8 obtains an absolute block address of the start sector SOT of the track T(1, 0), ABA[SOT] by calculation. In consequence, ABA[SOT]=10.

Next, the MPU 8 transforms F.LBA[2], which is the first (series of) defective sector(s) before LBA[SOR] whose value is 10, into D.ABA.ST[2] with reference to the PDM shown in FIG. 5C. The MPU 8 obtains a total number of initial defective sectors existing before the (series of) initial defective sector(s) of F.LBA[2], that is, D.LE[0]+D.LE[1]= 4. D.ABA.ST[2] can be obtained by adding this sum to F.LBA[2] whose value is 6. In consequence, D.ABA.ST[2]= 10. Since ABA[SOT]≦D.ABA.ST[2] (<ABA[SOR]), the (series of) defective sector(s) at the register number Y=2 exists in the track T(1, 0). Next, the MPU 8 transforms F.LBA[1] into D.ABA.ST[1]. In consequence, D.ABA.ST[1]=8. Since D.ABA.ST[1]<ABA[SOT], the (series of) defective sector(s) at the register number Y=1 exists in a track before the track T(1, 0). Therefore, the (series of) defective sector(s) at the register number Y=0 also exists in a track before the track T(1, 0).

In the PDM shown in FIG. 5C, a series of defective sectors registered at one register number never passes over tracks. Therefore, the MPU 8 can simply judge whether a series of defective sectors exists in the track T(1, 0), by judging whether a first absolute block address of the (series of) defective sector(s), D.ABA.ST, exists in the track T(1, 0).

The MIN.LBA of the track T(1, 0) can be easily obtained by subtracting a total number of initial defective sectors existing in tracks before the track T(1, 0), that is, D.LE[0]+ D.LE[1], whose value is 4, from ABA[SOT] of the track T(1, 0) whose value is 10. In consequence, Min. LBA=6.

In addition, the MPU 8 makes a PDM register number Y, which the MPU 8 makes the HDC 6 refer to, 2 when the HDC 6 generates the ID table of the track T(1, 0). The MPU 8 selects a register number, where a first (series of) defective sector(s) after the SOT of the track T(1, 0) is registered, as the PDM register number that the HDC 6 is made to refer to. If the (series of) defective sector(s) at the register number Y=3 does not exist in the track T(1, 0) but exists in the track T(0, 0), the MPU 8 makes the register number Y, which the MPU 8 makes the HDC 6 refer to, 3. In addition, if the (series of) defective sector(s) at the register number Y=1 exists in the track T(1, 0), the MPU 8 makes the register number Y, which the MPU 8 makes the HDC 6 refer to, 1.

Then, in the step [a] described above, the MPU 8 sends Min. LBA=6, T.LE=10, and the reference PDM register number Y=1 to the HDC 6 as the ID table information of the track T(1, 0) to make the HDC 6 generate the ID table of the track T(1, 0).

FIGS. 7A to 7C are explanatory diagrams of a track ID table generated for the initial defective sectors, shown in FIG. 4, in a disk apparatus according to an embodiment of the present invention. In FIGS. 7A to 7C, FIG. 7A shows an ID table of the track T(0, 0), FIG. 7B does an ID table of the track T(1, 0), and FIG. 7C does an ID table of the track T(2, 0). In addition, "xs" represents a SEC to which an LBA is not assigned. This SEC to which an LBA is not assigned is a SEC of an initial defective sector without exception.

In the step [b] described above, the HDC 6 generates the ID table of the track T(1, 0) as shown in FIG. 7B with referring to the PDM in FIG. 5C according to the ID table information inputted from the MPU 8.

First, the HDC 6 skips SEC whose values are 0 and 1 since F.LBA=6 and D.LE=2 are registered at the register number Y=2 in the PDM shown in FIG. 5C. Then, the HDC 6 assigns MIN.LBA=6 to SEC=2. Then, the HDC 6 increments the reference register number Y to 2. Next, the HDC 6 assigns LBA=7, . . . , 13 to SEC=3, . . . , 9 in order. Since the sector with SEC=9 is the EOT of the track T(1, 0), the HDC 6 terminates the generation of the ID table of the track T(1, 0) after assigning LBA=13 to SEC=9.

In the step [c] described above, the MPU 8 refers to the ID table of the track T(1, 0) that is generated, and recognizes that four sectors with LBA=10, . . . , 13, which the disk apparatus is requested to access, are the sectors with SEC=6, . . . , 9 in the track T(1, 0). Therefore, the MPU 8 instructs the HDC 6 to access these four sectors.

In the step [c] described above, according to the access instruction described above, the HDC 6 makes the head H(0 (=HED)) access the track T(1(=CYL), 0(=HED)) to write data in the sectors SEC=6, . . . , 9 or to read data from the sectors SEC=6, . . . , 9.

First, the HDC 6 refers to a read signal of a servo pattern (a cylinder identification number CYL and a burst pattern) obtained by a read element of the head H(0). Then, the HDC 6 seeks the track T(1, 0) by controlling the actuator 2 by the driver module 3, and makes the head H(0) be positioned over and follow this track T(1, 0). Then, the HDC 6 refers to a read signal of a servo pattern (a track start pattern) obtained by the read element of the head H(0), and detects the timing of the head H(0) passing over the sectors SEC=6, . . . , 9. Furthermore, the HDC 6 writes data in the sectors SEC=6, . . . , 9 by a write element of the head H(0) in case of a write access, and reads data from the sectors SEC=6, . . . , 9 by a read element of the head H(0) in case of a read access.

The MPU 8 and HDC 6 sequentially generate ID tables of all tracks where the sectors with LBA=10, . . . , 19 that the disk apparatus is requested to access exist, so as to access all sectors from the SOR (LBA=10) to the EOR (LBA=19), and sequentially access these tracks. It is possible to perform in parallel to perform the disk access in the step [c] described above and to generate the ID tables of the tracks, which are the second and subsequent tracks, in the steps [a] and [b].

If the MPU 8 refers to the ID table of the track T(1, 0) first generated, and recognizes that only the sectors with LBA= 10, . . . , 13 exist in the track T(1, 0) among the sectors with LBA=10, . . . , 19 that the disk apparatus is requested to access, the MPU 8 discriminates the track where the sector with LBA=14 exists.

First, the MPU 8 refers to the PDM in FIG. 5C, and obtains an absolute block address of the sector with LBA= 32, ABA[14(=LBA)]. The (series of) defective sectors with F.LBA=14 or smaller at LBA are registered at the register number Y=0, . . . , 3. Therefore, the MPU 8 simply adds the sum, which is 6, of the defective sector length D.LE at Y=0, . . . , 3 to LBA=14. In consequence, ABA[14(=LBA)]=20. Next, the MPU 8 transforms ABA[14(=LBA)]=20 into CHS, and in consequence, CYL=2, HED=0, and SEC=0. Owing to this, the MPU 8 recognizes that the sector with LBA=14 is located in the track T(2(=CYL), 0(=HED)).

The MIN.LBA of the track T(2, 0) is the LBA whose value is 14. Although, in a track an ID table of which is generated first (here, T(0, 0)), LBA[SOR] of interest is not always a MIN.LBA, each LBA of interest (here, LBA=14) in the second and subsequent tracks is always a MIN.LBA. In addition, the MPU 8 calculates the sector length of the track T(2, 0), T.LE. In consequence, T.LE=10.

Furthermore, the MPU 8 sends MIN.LBA=14, T.LE=10, and Y=3 (Y is the reference register number in the PDM) as the ID table information of the track T(2, 0) to the HDC 6 to make the HDC 6 generate the ID table of the track T(2, 0). In addition, it is also possible not to send the ID table information, described above, to the HDC 6 when the HDC 6 generates second and subsequent ID tables. In that case, the HDC 6 makes the value of 14, which is obtained by adding 1 to the maximum logical block address that is LBA=13, at the time of generating the last ID table, as the present MIN.LBA. Furthermore, the MPU 8 makes the T.LE, whose value is 10, at the time of generating the last ID table as the present T.LE as it is. Moreover, the MPU 8 makes the last reference register number Y=3 as the present reference register number as it is.

The HDC 6 generates the ID table of the track T(2, 0) as shown in FIG. 7C with referring to the PDM shown in FIG. 5C according to the ID table information inputted from the MPU 8.

First, the HDC 6 assigns MIN.LBA=14 to SEC=0. Next, the MPU 8 skips SEC=1 since F.LBA=15 and D.LE=1 are registered at the register number Y=3 in the PDM shown in FIG. 5C. Then, the HDC 6 assigns LBA=15 to SEC=2. Furthermore, the HDC 6 increments the reference PDM register number Y to 4. Next, the HDC 6 assigns LBA=16, 22 to SEC=3, . . . , 9 in order. Since the sector with SEC=9 is the EOT of the track T(2, 0), the HDC 6 terminates the generation of the ID table of the track T(2, 0) after assigning LBA=22 to SEC=9.

In addition, if the disk apparatus is requested to access LBA=10, . . . , 19, the ID table of the track T(0, 0) is not generated. Nevertheless, if it is instructed to generate the ID table of the track T(0, 0), the HDC 6 generates the ID table shown in FIG. 7A. The HDC 6 assigns MIN.LBA=0 to SEC=0, and assigns LBA=1 to SEC=1. Next, the MPU 8 skips SEC=2, 3 since F.LBA=2 and D.LE=2 are registered at the register number Y=0 in the PDM shown in FIG. 5C. Then, the HDC 6 skips SEC=2, 3 and assigns LBA=2 to SEC=4. Furthermore, the HDC 6 increments the reference register number Y to 1. Next, the HDC 6 assigns LBA=3, 4, 5 to SEC=5, 6, 7 in order. Furthermore, the MPU 8 skips SEC=8, 9 since F.LBA=6 and D.LE=2 are registered at the register number Y=1 in the PDM shown in FIG. 5C. Then, the HDC 6 increments the reference register number Y to 2 after skipping SEC=9. In addition, since the sector with SEC=9 is the EOT of the track T(0, 0), the HDC 6 terminates the generation of the ID table of the track T(0, 0) after skipping SEC=9.

In this manner, in a PDM according to the present embodiment, a series of defective sectors consisting of a plurality of initial defective sectors with continuous D.ABA that exist in the same track is registered in a batch. Furthermore, the initial defective sectors in the series of defective sectors are separately registered if tracks are different even if the D.ABA are continuous. Therefore, it never arises to erroneously judge a normal sector defective.

In the conventional PDM shown in FIG. 13C, a series of initial defective sectors passing over the tracks T(1, 0) and T(2, 0) is registered at the register number Y=1. Furthermore, an HDC of the conventional disk apparatus generates an ID table of the track T(2, 0) with referring to such defect information that F.LBA[1]=6 and D.LE[1]=4. Therefore, in the conventional disk apparatus, normal SEC, whose values are 2 and 3 in the track T(2, 0), are classified as defective sectors. Nevertheless, in the PDM shown in FIG. 5C, a series of initial defective sectors passing over the tracks T(1, 0) and T(2, 0) is divided into a series of defective sectors existing in the track T(1, 0) and a series of defective sectors existing in the track T(2, 0), which are registered at register numbers Y=1, 2, respectively. Then, the HDC 6 generates the ID table of the track T(2, 0) with referring to the register number Y=2 where the series of defective sectors existing in the track T(2, 0) is registered. Hence, the disk apparatus 10 according to the present embodiment can assign LBA to normal sectors of the track T(2, 0), whose SEC are 2 and 3.

In addition, in the disk apparatus 10 according to the present embodiment, there is no sector that does not have an LBA even though the sector is normal. Therefore, the MPU 8 can easily transform an LBA into an ABA or can transform an ABA into an LBA by referring to PDM and simply adding the sum of the numbers of initial defective sectors before the sector of interest to the LBA of the sector or simply subtracting the sum from the ABA of the sector. Therefore, it is not necessary to perform such complicated processing that it is judged by ABA/CHS transformation as performed in the conventional disk apparatus whether a series of defective sectors passes over tracks. Therefore, it is possible to simplify the LBA/ABA transformation processing and ABA/LBA transformation processing and to simplify the processing for generating ID tables. Hence it is possible to increase throughput at the time of a disk access.

The MPU 8 refers to the ID table of the track T(2, 0) that is generated, and recognizes that six sectors with LBA=14, ..., 19 that the disk apparatus is requested to access are the sectors with SEC=0, 2, ..., 6 in the track T(2, 0) to instruct the HDC 6 to access these six sectors.

The HDC 6 makes the head H(0(=HED)) access the track T(2(=CYL), 0(=HED)) according to the access instruction described above to write data in or read data from the sectors with SEC=0, 2, ..., 6 that are described above.

The MPU 8 refers to the ID tables of the tracks T(1, 0) and T(2, 0) generated, and recognizes that all the LBA, whose values are LBA=10 to 19 and which a write or read command requests to access, are located in the tracks T(1, 0) and T(2, 0). Then the MPU 8 finishes the generation of the ID tables for command processing described above.

In addition, a data amount can be reduced by dividing the PDM-A, where each series of initial defective sectors with continuous D.ABA, which exists in the same track, is registered in a batch by D.ABA.ST and D.LE of the series of initial defective sectors being registered, or the PDM-B, where each series of initial defective sectors with continuous D.ABA, which exists in the same track, is registered in a batch by F.LBA and D.LE of the series of initial defective sectors being registered, into a virtual track table (VTT) and a virtual sector table (VST).

FIGS. 8A1 to 8B2 are explanatory diagrams each showing the structure of a batch register PDM divided into VTT and VST. In FIGS. 8A1 to 8B2, FIG. 8A1 is a structural drawing of the PDM-A before division, FIG. 8A2 is a structural drawing of the PDM-A after division into the VTT and VST, FIG. 8B1 is a structural drawing of the PDM-B before division, FIG. 8B2 is a structural drawing of the PDM-B after division into the VTT and VST. In addition, in FIGS. 8A1 to 8B2, a first absolute block address of defective sectors, D.ABA.ST, a false logical block address F.LBA, a virtual track number VTRA, and a virtual sector number VSEC are in hexadecimal notation. Therefore, the D.ABA.ST and F.LBA are 28-bit data.

Each PDM consisting of a VTT and a VST (FIGS. 8A2 and 8B2) is obtained by registering the upper 12 bits of the 28-bit D.ABA.ST or F.LBA as a virtual track number VTRA in the VTT and registering the upper 16 bits of the D.ABA.ST or F.LBA as a virtual sector number VSEC in the VST.

In the VST, the virtual sector number VSEC and defective sector length D.LE of a series of initial defective sectors are registered for every PDM register number Y. In addition, in the VTT, an initial register number Y.ST to which a VTRA is applied is registered for every virtual track number VTRA.

If two or more series of initial defective sectors are registered in the same VTRA, the PDM consisting of the VTT and VST can reduce a data amount, and the more series of initial defective sectors are registered in the same VTRA, the higher a data compression rate become.

If the PDM consisting of the VTT and VST is registered as a final PDM, each D.ABA.ST or F.LBA can be recognized in the following procedure. For example, in each VTT shown in FIGS. 8A2 and 8B2, an initial register number Y.ST of the VTRA whose value is 002[h] ([h]: a symbol for showing hexadecimal notation) is 0, and an initial register number Y.ST of the VTRA whose value is 003[h] is 4. Therefore, in each VST in FIGS. 8A2 and 8B2, the VTRA at the register number Y=3 is 002[h]. Hence, in FIG. 8A2, the VTRA whose value is 002[h] is attached as the upper digits of the VSEC, whose value is ABCD[h], at the register number Y=3, and hence the D.ABA.ST at the register number Y=1 becomes 002ABCDh. In addition, in FIG. 8B2, the VTRA whose value is 002[h] is attached as the upper digits of the VSEC, whose value is ABC3h, at the register number Y=3, and hence the F.LBA at the register number Y=1 becomes 002ABC3[h].

A procedure for generating an RDM by the disk apparatus 10 according to the present embodiment will be described below. If a subsequent defective sector arises in a disk access and alternative processing is performed, the control unit:

[1] detects the subsequent defective sector, secures an alternative sector for this subsequent defective sector in an alternative track, and adds alternative information (a logical block address of the subsequent defective sector (D.LBA), a logical block address and sector length of the alternative sector (S.LBA and LE (=1) respectively)) to the RDM individually;

[2] discriminates a series of defective sectors among a plurality of subsequent defective sectors with continuous D.LBA, whose alternative sectors have continuous S.LBA, in the RDM where the alternative information described above is added individually, and generating an RDM where this series of defective sectors and alternative sectors corresponding to this series of defective sectors are registered in a batch by a first logical block address of the series of defective sectors (D.LBA), and a first logical block address and sector length of the series of alternative sectors (S.LBA and LE) being registered; and

[3] records the batch register RDM in the system reserve region on the disk surface DS or nonvolatile memory region in the memory 7.

FIG. 9 is an example showing the occurrence of subsequent defective sectors in a track that is part of a disk. In FIG. 9, for simple description, all the tracks of the disk apparatus are made to be 11 tracks, that is, T(0, 0) to T(10, 0). The tracks T(0, 0) to T(9, 0) are data tracks, and the T(10, 0) is an alternative track provided for the 10 data tracks described above. In addition, it is assumed that sector length of each track, T.LE, is 10. In addition, FIG. 9 is a schematic drawing, and hence the number of all the tracks, T.LE, and the like are different from those in an actual disk apparatus.

In FIG. 9, D1, D2, and D3 are subsequent defective sectors that arise in the track T(3, 0) in this order. In addition, R1, R2, and R3 are alternative sectors of the subsequent defective sectors D1, D2, and D3. Furthermore, a sector USED is an alternative sector that is assigned to a subsequent defective sector having arisen in another track before the occurrence of the subsequent defective sectors D1, D2, and D3.

FIGS. 10A to 10D are explanatory diagrams each showing the structure of an RMD generated for the subsequent defective sectors, shown in FIG. 9, in a disk apparatus according to an embodiment of the present invention. In FIGS. 10A to 10D, D.LBA is a (first) logical block address of a (series of) subsequent defective sector(s), S.LBA is a (first) logical block address of a (series of) alternative sector(s), and LE is sector length (the number of sectors) of the (series of) subsequent defective sector(s) and the (series of) alternative sector(s).

In FIGS. 10A to 10D, FIG. 10A shows an RDM generated at the time of alternative processing of the subsequent defective sector D1, and FIG. 10B shows an RDM generated at the time of alternative processing of the subsequent defective sector D2. FIGS. 10C and 10D show RDM generated at the time of alternative processing of the subsequent defective sector D3. Thus, FIG. 10C shows an RDM generated by adding alternative information of the subsequent defective sector D3 to the RDM shown in FIG. 10B. In addition, FIG. 10D shows an RDM where a series of subsequent continuous defective sectors and a series of alternative continuous sectors corresponding to this series of subsequent continuous defective sectors are registered in a batch by each address and sector length being registered. FIGS. 10A, 10B, and 10D show the structure of final RDM (RDM recorded in the system reserve region or memory 7). In the RDM shown in FIGS. 10A to 10D, contents are sorted in ascending order of the D.LBA so that the larger the register number Z becomes, the larger the D.LBA may become.

If the subsequent defective sector D1 arises in the track T(3, 0) during a disk access, the control unit generates the RDM as shown in FIG. 10A by securing an alternative sector R1, and individually adding the alternative information, consisting of D.LBA=24 (LBA of the sector D1), S.LBA=96 (LBA of the sector R1), and LE=1, to the RDM. The (series of) defective sector(s) at each register number Z=0, 1 has D.LBA being not continuous with each other, and hence the control unit records the RDM, shown in FIG. 10A, in the system reserve region or memory 7 as it is.

The control unit selects as R1 a sector that exists at a position that is separated from the sector D1 by 180° so that the head H can access the sector (LBA=23) just before the subsequent defective sector D1 (LBA=24) during one rotation of the disk, seek the alternative track T(10, 0) after that, access the alternative sector R1 of the subsequent defective sector D1, seek the track T(3, 0) again after that, and access the sector (LBA=25) just after the subsequent defective sector D1.

If the subsequent defective sector D2 arises in the track T(3, 0) in a disk access after the alternative processing of the subsequent defective sector D1, the control unit generates the RDM as shown in FIG. 10B by securing an alternative sector R2, and individually adding the alternative information, consisting of D.LBA=26 (LBA of the sector D2), S.LBA=99 (LBA of the sector R2), and LE=1, to the RDM. The (series of) defective sector(s) at each register number Z=0, 1, 2 has D.LBA being not continuous with each other, and hence the control unit records the RDM, shown in FIG. 10B, in the system reserve region or memory 7 as it is.

The control unit selects as R2 the alternative sector (LBA=99) just after the alternative sectors (LBA=98) since the alternative sector (LBA=98), which is separated from the sector D2 by 180°, has already been used.

If the subsequent defective sector D3 arises in the track T(3, 0) in a disk access after the alternative processing of the subsequent defective sectors D1 and D2, the control unit generates the RDM as shown in FIG. 10C by securing an alternative sector R3, and individually adding the alternative information, consisting of D.LBA=25 (LBA of the sector D3), S.LBA=97 (LBA of the sector R3), and LE=1, to the RDM.

In the RDM shown in FIG. 10C, D.LBA of the defective sectors at register numbers Z=0, 1 are continuous and also S.LBA of the alternative sectors at the register numbers Z=0, 1 are continuous. Here, let D.LBA at the register number Z be D.LBA[Z], let S.LBA at the register number Z be S.LBA[Z], and let LE at the register number Z be LE[Z]. Then, D.LBA[0]+LE[0]=D.LBA[1] and S.LBA[0]+LE[0]=S.LBA[1]. In addition, D.LBA of the defective sectors at register numbers Z=1, 2 are continuous but S.LBA of the alternative sectors at the register numbers Z=1, 2 are not continuous. Furthermore, at Z=0, 1, if D.LBA[0]+LE[0]=D.LBA[1] and S.LBA[1]+LE[1]=S.LBA[0], it is assumed that S.LBA of the alternative sectors are not continuous.

The control unit generates the RDM as shown in FIG. 10D by registering the alternative information of the defective sectors with continuous D.LBA and alternative sectors with continuous S.LBA, which is listed at Z=0, 1, in a batch by registering the first logical block address of the series of defective sectors, D.LBA=24, the first logical block address of the series of alternative sectors, S.LBA=96, and sector length LE=2. Furthermore, the control unit records the RDM, shown in FIG. 10D, in the system reserve region or memory 7.

In this manner, in each RDM according to the present embodiment, each series of defective sectors consisting of a plurality of subsequent defective sectors with continuous D.LBA that have alternative sectors with continuous LBA (S.LBA) that correspond to the plurality of subsequent defective sectors is registered in a batch. In addition, if D.LBA are continuous but LBA of alternative sectors are not continuous, the series of defective sectors is divided and registered separately. Therefore, register contents of alternative sectors never become complicated. In each RDM according to the present embodiment, a data amount is smaller than that of a conventional RDM where subsequent defective sectors and alternative sectors corresponding to the subsequent defective sector are registered individually. Furthermore, it is possible to easily judge continuity of LBA of alternative sectors. Since it is possible to simplify processing for accessing an alternative sector with reference to RDM so as to increase throughput at the time of a disk access.

Figure 11:
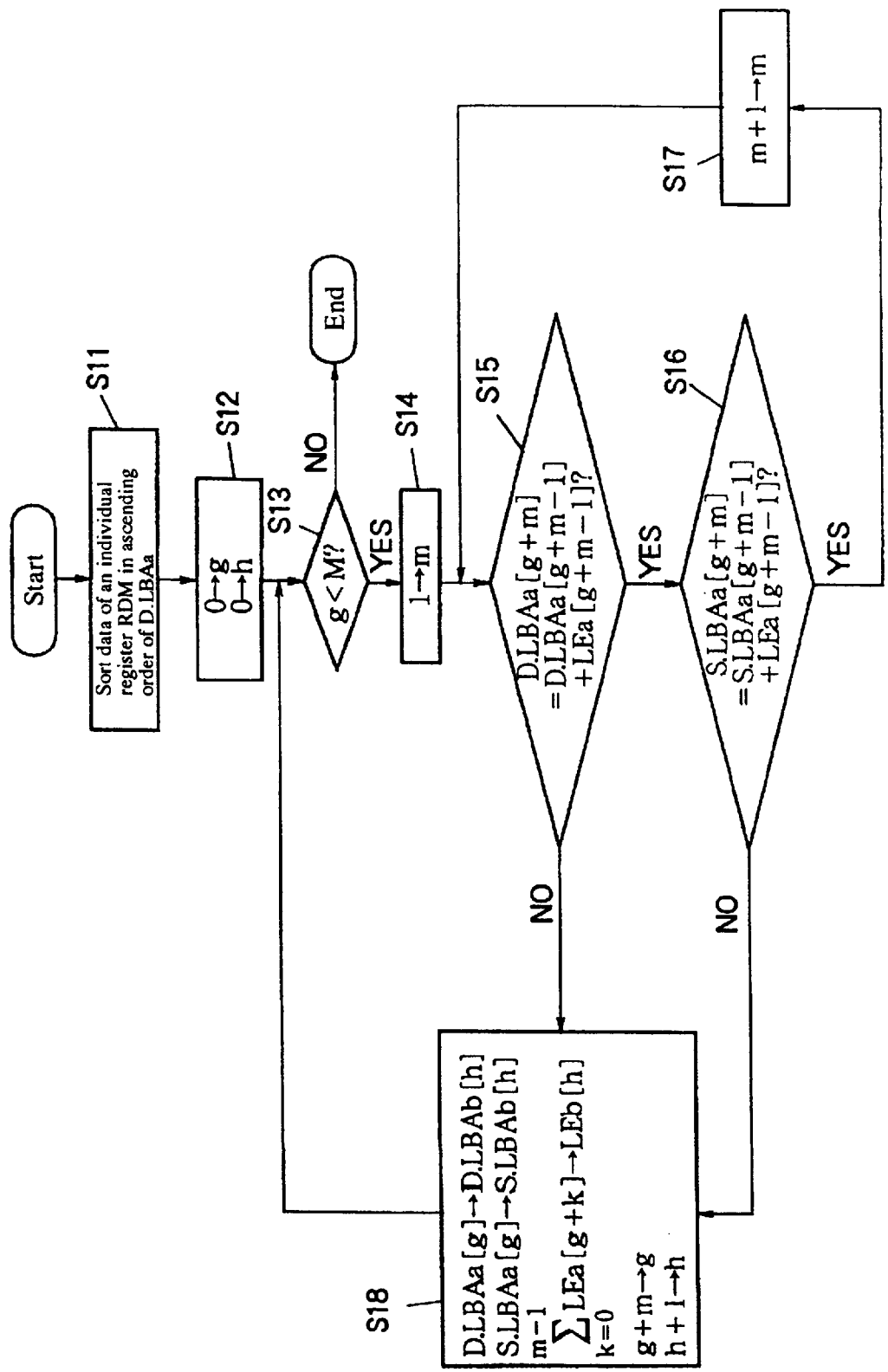
FIG. 11 is a flow chart showing a procedure for generating a batch register RDM from an individual register RDM in a disk apparatus according to an embodiment of the present invention.
Figure 12:
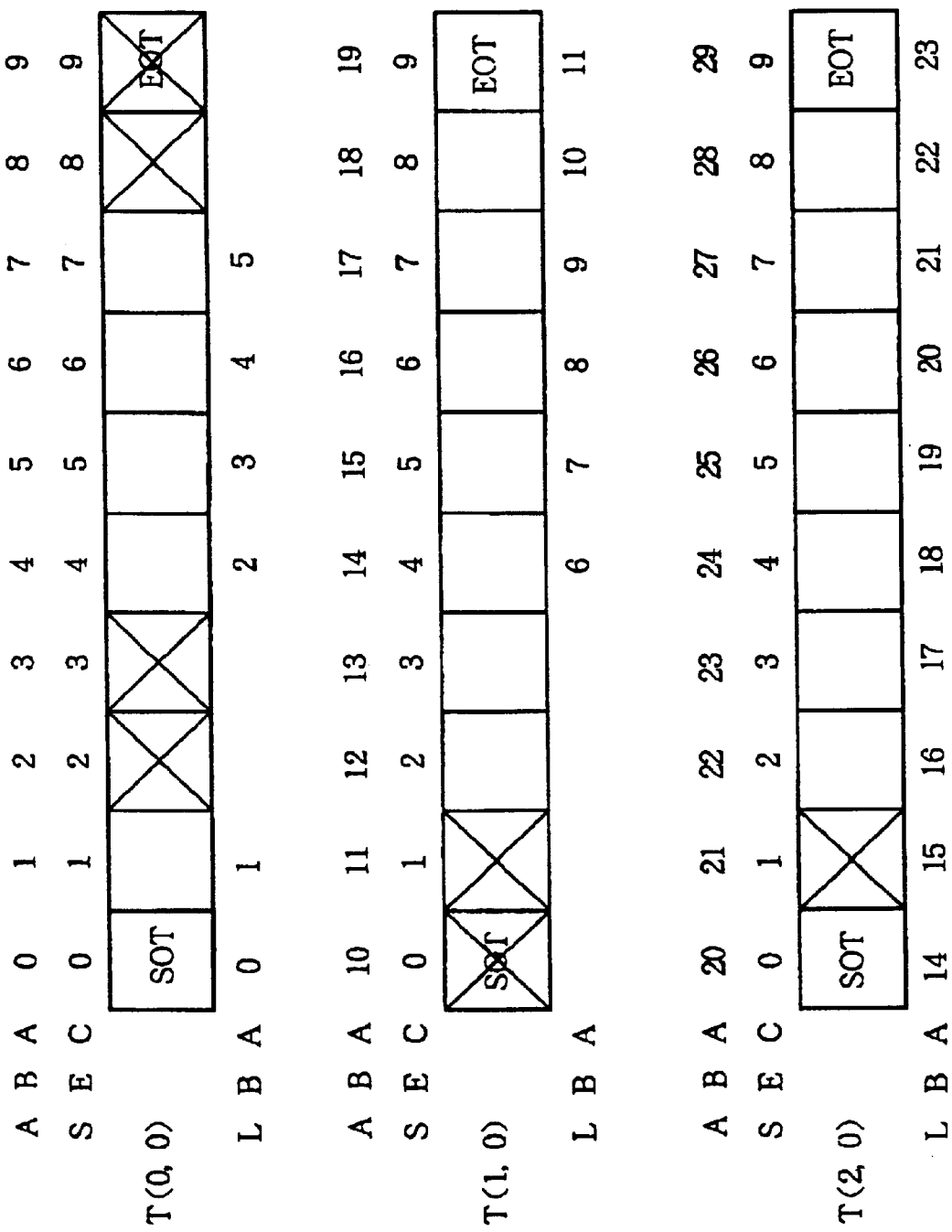
FIG. 12 is an example of initial defective sectors in a track that is part of a disk.

FIG. 11 is a flow chart showing a procedure for generating a batch register RDM from an individual register RDM in a disk apparatus according to an embodiment of the present invention. In the following description of FIG. 11, it is assumed that M (series of) subsequent defective sectors are registered in the individual register RDM (see FIG. 10C). In addition, let D.LBA, S.LBA, and LE in the individual register RDM be D.LBAa, S.LBAa, and LEa respectively. Furthermore, let D.LBA, S.LBA, and LE in the batch register RDM (see FIG. 10D) be D.LBAb, S.LBAb, and LEb respectively.

At step S11 in FIG. 11, the control unit sorts the (series of) defective sectors, which are registered in the individual register RDM, in ascending order of the D.ABA so that the larger the register number Z becomes, the larger the D.ABA may become.

After this, the control unit discriminates the series of defective sectors with continuous LBA by the processing at step S12 and after, and judges whether LBA of the alternative sectors corresponding to this series of defective sectors are continuous. Then, the control unit generates the RDM where the control unit registers the series of defective sectors and series of alternative sectors with continuous LBA in a batch (see FIG. 10D).

In the step S12, the control unit sets variables q and h to be 0, and judges at step S13 whether a value of the counter q is smaller than a register number of the individual register RDM (M), that is, whether g<M. Then, if g<M, the process goes to step S14, and sets the variable m to be 1. Furthermore, the process goes to step S15. In addition, if g=M in the step S13, the control unit finishes the generation of the batch register RDM.

At step S15, the control unit judges whether a value of D.LBA[g+m], which is registered at the register number g+m in the individual register RDM, equals an added value of D.LBA[g+m−1] and LE[g+m−1] that are registered at the register number q just before the register number. Thus, by judging whether the LBA of a first defective sector at Z=g+m is the LBA just after the LBA of a last defective sector at Z=g+m−1, the control unit judges whether the (series of) defective sector(s) at Z=g+m−1 and the (series of) defective sector(s) at Z=g+m are continuous.

In the step S15, if D.LBA[g+m]=D.LBA[g+m−1] +LE[g+m−1], the process goes to step S16. Alternatively, D.LBA[g+m]≠D.LBA[g]+LE[g+m−1], the process goes to step S18.

In the step S16, the control unit judges whether a value of S.LBA[g+1], which is registered at the register number g+1 in the individual register RDM, equals an added value of S.LBA[g+m−1] and LE[g+m−1] that are registered at the register number q just before the register number. Thus, by judging whether the LBA of a first alternative sector at Z=g+1 is the LBA just after the LBA of a last alternative sector at Z=g+m−1, the control unit judges whether the (series of) alternative sector(s) at Z=g+m−1 and the (series of) alternative sector(s) at Z=g+1 are continuous.

In the step S16, if S.LBA[g+m]=S.LBA[g+m−1]+LE[g+m−1], the control unit increments the variable by one at step S17, and the process returns to the step S15. Alternatively, S.LBA[g+1]≠S.LBA[g]+LE[g], the process goes to step S18.

In the step S18, the control unit registers D.LBAa[g] in the individual register PDM as D.LBAb[h] in the batch register PDM, and registers S.LBAa[g] in the individual register PDM as S.LBAb[h] in the batch register PDM. In addition, the control unit registers an added value of LEa from Z=g to Z=g+m−1 in the individual register PDM, that is, LEa[g]+LEa[g+1]+, . . . ,+LEa[g+m−1] as LEb[h] in the batch register RDM. Then, the control unit increments the variable q by m and the variable h by one, and the process returns to the step S13. By the above procedure, the batch register RDM is generated.

A procedure for accessing an alternative sector will be described below. The control unit refers to the PDM when accessing the track T(3, 0) (see FIG. 9), and generates an ID table of the track T(3, 0). Furthermore, with referring to this ID table and the RDM in FIG. 10D, the control unit recognizes that alternative processing of LBA, whose values are 24 to 26, in the track T(3, 0) is performed.

Next, with referring to the contents at Z=0 in the RDM shown in FIG. 10D, the control unit recognizes that the alternative sectors of a series of defective sectors D1 and D3 with LBA=24, 25 are a series of alternative sectors R1 and R3 with LBA=96, 97. Then, with referring to the PDM, the control unit discriminates a track where the sectors with LBA=96, 97 exist, and generates an ID table of the track. Thus, the control unit generates the ID table of the alternative track T(10, 0). Furthermore, with referring to the contents at Z=1 in the RDM shown in FIG. 10D, the control unit recognizes that an alternative sector of the defective sector D2 with LBA=26 is an alternative sector R2 with LBA=99. Then, with referring to the PDM, the control unit discriminates a track where the sector with LBA=99 exists, and if an ID table of the track is not generated, the control unit generates the ID table of the track. In addition, here, the ID table of the alternative track T(10, 0) where the alternative sector with LBA=99 exists has already been generated just before.

Alternatively, with referring to the contents at Z=0 in the RDM shown in FIG. 10D and the PDM, the control unit generates an ID table of the series of alternative sectors R1 and R3 with LBA=96, 97, that is, an ID table where CHS (CYL, HED, and SEC) and LBA of the alternative sectors R1 and R3 are associated with each other. Furthermore, with referring to the contents at Z=1 in the RDM shown in FIG. 10D and the PDM, the control unit generates an ID table of the alternative sector R2 with LBA=99, that is, an ID table where CHS (CYL, HED, and SEC) and LBA of the alternative sector R2 are associated with each other.

Moreover, with referring to the ID table of the alternative track T(10, 0) or the ID table of the alternative sectors R1, R3, and R1, seeking the alternative track T(10, 0), and positioning the head H(0 (=HED)) above the track T(10, 0) and making the head H(0) follow the track T(10, 0), the control unit accesses the alternative sectors R1, R3, and R1.

As described above, according to the embodiments of the present invention, owing to a defect map having such structure that a series of defective sectors consisting of a plurality of initial defective sectors with continuous D.ABA that exist in the same track, or a series of defective sectors consisting of a plurality of subsequent defective sectors with continuous D.LBA that have alternative sectors with continuous LBA that correspond to the subsequent defective sectors is registered in a batch by registering its first address and sector length, it is possible to eliminate a sector, to which LBA is not assigned, even though the sector is normal. Furthermore, it is possible to simplify ABA/LBA transformation processing and the like in relation to referring to the defect map at the time of disk accesses, and hence it is possible to increase throughput at the time of a disk access.

As described above, according to the present invention, owing to a defect map having such structure that a series of defective sectors consisting of a plurality of defective sectors with continuous addresses that satisfy a predetermined condition in regard to a partial region located (a track in case of a disk apparatus) or the corresponding alternative sectors is registered in a batch by registering its first address and sector length, it is possible to increase the throughput of a recording apparatus at the time of an access to a data recording medium.

What is claimed is:

1. A defect register method for registering in a defect map an address of a defective sector in a data recording medium, which is divided into a plurality of partial regions each of which is divided into a plurality of sectors, comprising the steps of:

(A) discriminating a series of defective sectors consisting of a plurality of defective sectors with continuous addresses, the plurality of defective sectors meeting a predetermined condition with respect to a partial region where the defective sectors are located or alternative sectors which correspond to the defective sectors;

(B) logically grouping sectors with contiguous addresses that are all within a same partial region and identifying a grouping of said sectors with an address of a first sector within said group and a length of the sectors within said group, wherein said logically grouping excludes sectors not within said partial region; and (C) registering the series of defective sectors in a defect map by registering a first address and sector length of the series of defective sectors, wherein said grouping of said sectors is registered similarly to individual sectors within said defect map such that substantially less storage area is required to register contiguous defective sectors within said defect map and less processing overhead is required to register and access said series of defective sectors of said data recording medium.

2. The defect register method according to claim 1, wherein the step (A) further comprises a step of discriminating a series of defective sectors consisting of a plurality of defective sectors with continuous addresses, where the plurality of defective sectors exist in the same partial region.

3. The defect register method according to claim 1, wherein:

the step (A) further comprises a step of discriminating a series of alternative sectors with continuous addressed corresponding to a plurality of defective sectors with continuous addresses; and the step (B) further comprises a step of registering the series of defective sectors and the series of alternative sectors, which correspond to the series of defective sectors, in a defect map by registering a first address and sector length of both the series of defective sectors and the corresponding series of alternative sectors, wherein a grouping of alternative sectors having continuous addresses within a single partial region are provided for each grouping of defective sectors.

4. The defect register method according to claim 1 further comprising generating a primary defect map (PDM)-B address by transforming a PDM-A address into a false logical block address.

5. A defect map recording medium that records a defect map, in which an address of a defective sector in a data recording medium, which is divided into a plurality of partial regions each of which is divided into a plurality of sectors, is recorded and is computer-readable, wherein the defect map recording medium records a defect map with a series of defective sectors containing a plurality of defective sectors with continuous addresses, that meet a predetermined condition with respect to a partial region where the defective sectors are located; wherein the defective sectors, are registered by a first address and sector length of the plurality of defective sectors being registered following a logical grouping of the plurality of sectors with contiguous addresses that are all within a same partial region, said logically grouping excluding sectors not within said partial region, and wherein said grouping of said sectors is registered similarly to individual sectors within said defect map such that substantially less storage area is required to register contiguous defective sectors within said defect map and less processing overhead is required to register and access said series of defective sectors of said data recording medium.

6. The defect map recording medium according to claim 5, wherein a series of defective sectors consisting of a plurality of defective sectors with continuous addresses in the same partial region is registered in the defect map by a first address of a first sector and sector length of the series of defective sectors being registered.

7. The defect map recording medium according to claim 5, wherein a series of defective sectors consisting of a plurality of defective sectors with continuous addresses, whose alternative sectors have continuous addresses, and a series of alternative sectors which correspond to the defective sectors are registered in the defect map by the first address and sector length of both the series of defective sectors and the corresponding series of alternative sectors being registered.

8. The defect map recording medium according to claim 5 further comprising a primary defect map (PDM)-B address generated by transforming a PDM-A address into a false logical block address.

9. A disk apparatus comprising:

a disk recording medium which is divided into a plurality of tracks, each of which is divided into a plurality of sectors;

a defect map storage medium for storing a defect map where addresses of defective sectors in the disk recording medium are registered, wherein said addresses include individual addresses for defective sectors surrounded by normal sectors and group addresses formed similarly to said individual addresses for a series of defective sectors with continuous addresses within a single track among said plurality of tracks, wherein continuous addresses spanning two tracks are assigned two different addresses within said defect map;

a disk access mechanism for writing data into and reading data from the sector in the disk recording medium; and a disk access controller for referring to the defect map and making the disk access mechanism access a normal sector, wherein a series of defective sectors consisting of a plurality of defective sectors with continuous addresses, in the same track is registered in the defect map by a first address and sector length of the plurality of defective sectors being registered.

10. The disk apparatus according to claim 9, wherein the defect map recording medium is part of the disk recording medium or a nonvolatile semiconductor recording medium.

11. The disk apparatus according to claim 9, further comprising defect register logic for detecting a defective sector in the disk recording medium, discriminating a series of defective sectors consisting of a plurality of defective sectors with continuous addresses existing in the same track, and registering this series of defective sectors in the defect map by registering a first address and sector length of the series of defective sectors.

12. The disk recording apparatus according to claim 11, wherein the defect map recording medium is part of the disk recording medium or a nonvolatile semiconductor recording medium.

13. The disk apparatus according to claim 9 further comprising means for generating a primary defect map (PDM)-B address by transforming a PDM-A address into a false logical block address.

14. A disk apparatus comprising:
- a disk recording medium, which is divided into a plurality of tracks each of which is divided into a plurality of sectors;
- a defect map storage medium having a defect map where address positions of a defective sectors in the disk recording medium are registered, wherein said positions include individual addresses for defective sectors surrounded by normal sectors and group addresses formed similarly to said individual addresses for a series of defective sectors with continuous addresses within a single track among said plurality of tracks, wherein continuous addresses spanning two tracks are assigned two different addresses within said defect map;
- a disk access mechanism for writing data into and reading data from the sectors in the disk recording medium; and
- a disk access controller for referring to the defect map and making the disk access mechanism access a normal sector, wherein a series of defective sectors consisting of a plurality of defective sectors with continuous addresses, whose alternative sectors have continuous addresses, and a series of alternative sectors which correspond to the defective sectors are registered in the defect map by each first address and sector length of both the series of defective sectors and the corresponding series of alternative sectors being registered.

15. The disk apparatus according to claim 14, wherein the defect map recording medium is part of the disk recording medium.

16. The disk apparatus according to claim 14, wherein the defect map recording medium is part of a nonvolatile semiconductor recording medium.

17. The disk apparatus according to claim 14, further comprising defect register logic for detecting a defective sector in the disk recording medium, securing an alternative sector for this defective sector in the disk recording medium, discriminating a series of defective sectors consisting of a plurality of defective sectors with continuous addresses have continuous addresses, and registering this series of defective sectors in the defect map by registering each first address and sector length of both this series of defective sectors and the corresponding series of alternative sectors.

18. The disk apparatus according to claim 14 further comprising means for generating a primary defect map (PDM)-B address by transforming a PDM-A address into a false logical block address.

* * * * *